(12) United States Patent
Brogårdh

(10) Patent No.: US 7,300,240 B2
(45) Date of Patent: Nov. 27, 2007

(54) INDUSTRIAL ROBOT

(75) Inventor: Torgny Brogårdh, Västerås (SE)

(73) Assignee: ABB AB, Västerås (SE)

( * ) Notice: Subject to any disclaimer, the term of this patent is extended or adjusted under 35 U.S.C. 154(b) by 188 days.

(21) Appl. No.: 11/012,614

(22) Filed: Dec. 16, 2004

(65) Prior Publication Data

US 2005/0129495 A1 Jun. 16, 2005

Related U.S. Application Data

(60) Provisional application No. 60/578,322, filed on Jun. 10, 2004, provisional application No. 60/536,506, filed on Jan. 15, 2004, provisional application No. 60/529,695, filed on Dec. 16, 2003.

(51) Int. Cl.
*B25J 5/00* (2006.01)

(52) U.S. Cl. ............... 414/680; 74/490.01; 74/490.06; 414/735; 901/15; 901/29

(58) Field of Classification Search ............... 414/680, 414/735; 901/15, 23, 2 E, 29; 74/490.01, 74/490.03, 490.06
See application file for complete search history.

(56) References Cited

U.S. PATENT DOCUMENTS 6,974,297 B2 * 12/2005 Brogårdh .................... 414/680

FOREIGN PATENT DOCUMENTS

| WO | WO 0234480 A1 | 5/2002 |
|---|---|---|
| WO | WO 2004033161 A1 | 4/2004 |

OTHER PUBLICATIONS

Xin-Jun Liu, Jinsong Wang, Feng Gao, and Li-Ping Wang; On the Analysis of a New Spatial Three-Degrees-of-Freedom Parallel Manipulator; IEEE Transactions on Robotics and Automation; Dec. 2001; pp. 959-969; vol. 17, No. 6.

* cited by examiner

Primary Examiner—Donald Underwood
(74) Attorney, Agent, or Firm—Venable LLP

(57) ABSTRACT

An industrial robot including a platform arranged for carrying an object. A first arm is arranged for influencing the platform in a first movement and includes a first actuator having a first path and a first carriage linearly movable along the first path. A second arm is arranged for influencing the platform in a second movement, and includes a second actuator having a second path and a second carriage linearly movable along the first path. A third arm is arranged for influencing the platform in a third movement. A control unit controls the movements of the platform. The first and second arms are arranged rotatable in such way that the platform is movable between opposite sides of a second plane passing through and continuously following the first and second carriage. The control unit includes a control adapted to upon command perform a reconfiguration of the platform and the arms of the robot. The reconfiguration includes moving the platform between opposite sides of the second plane.

17 Claims, 44 Drawing Sheets

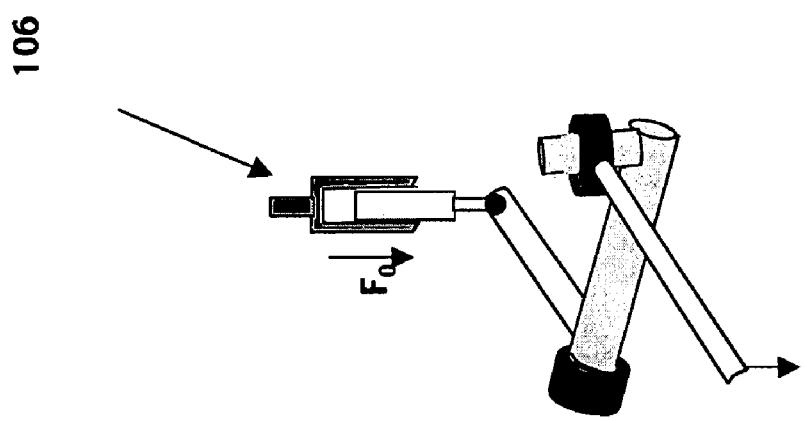
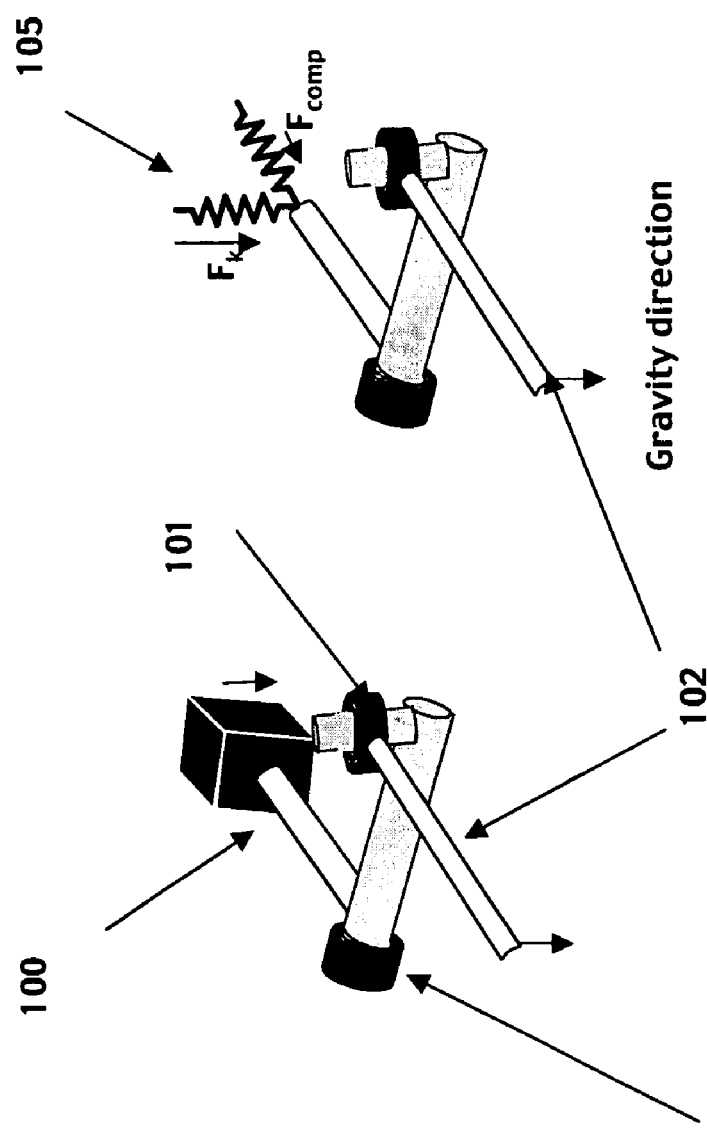
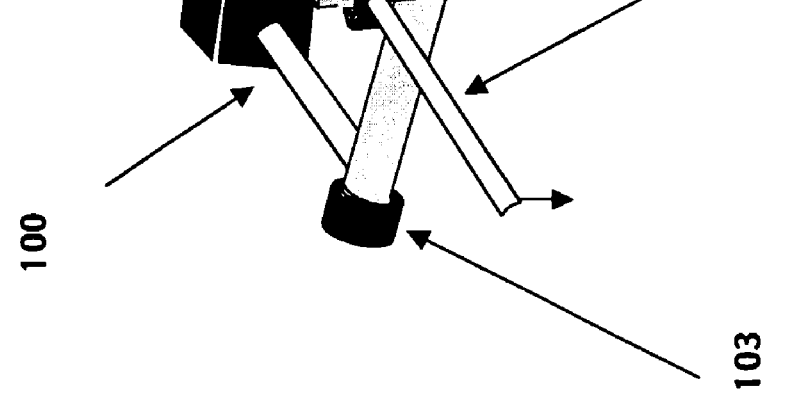

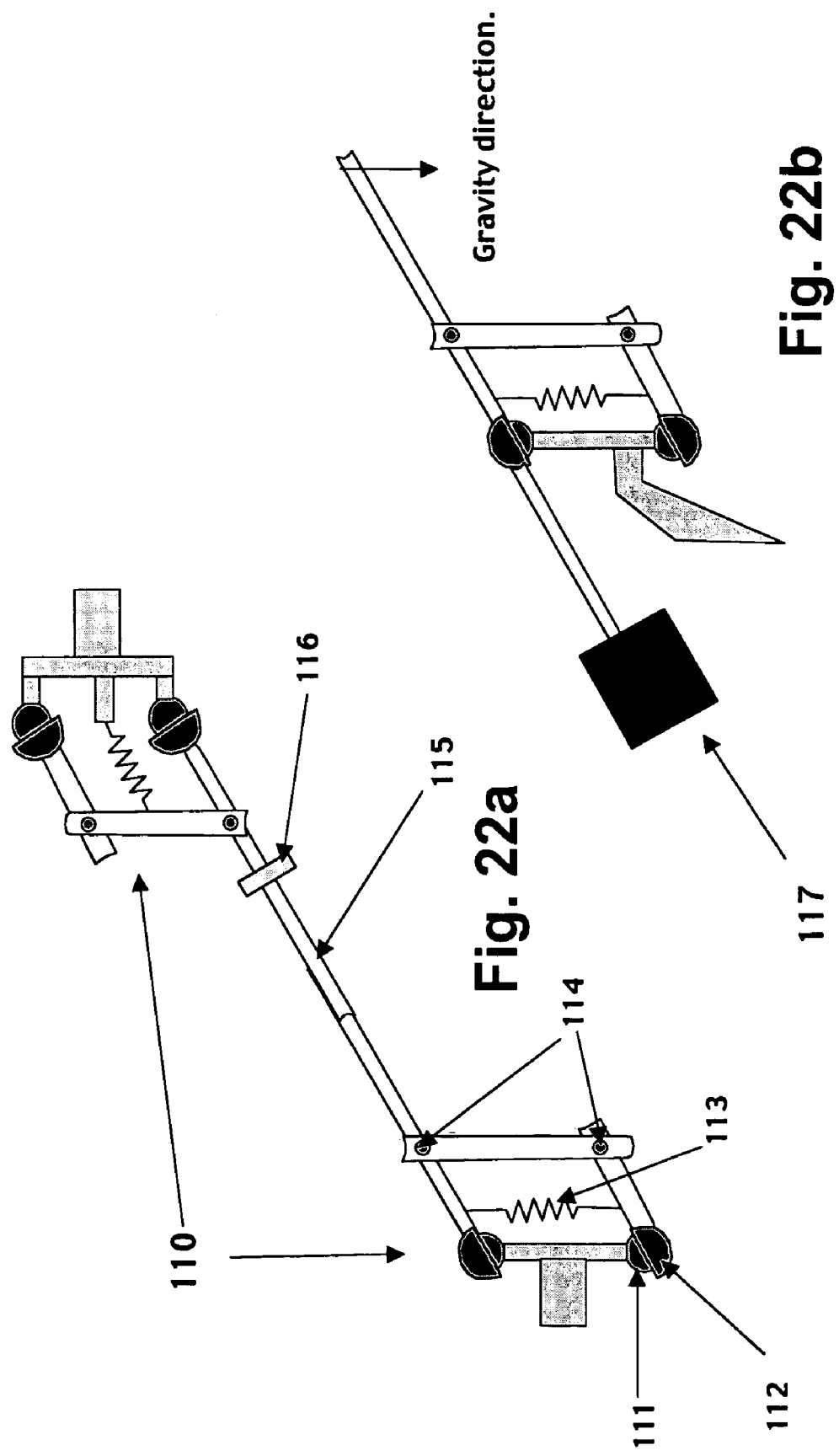

Open state

Locked state

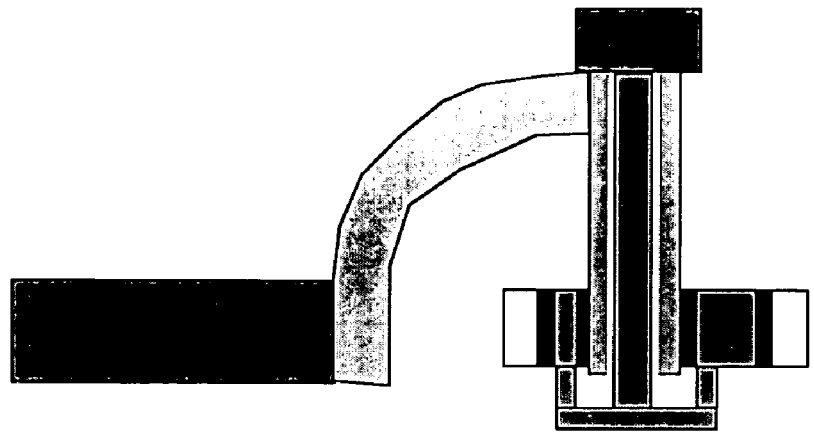
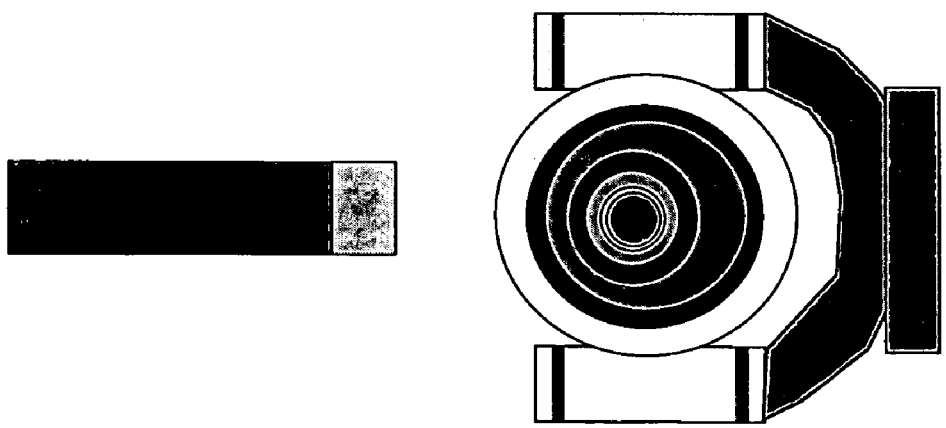
Fig. 31

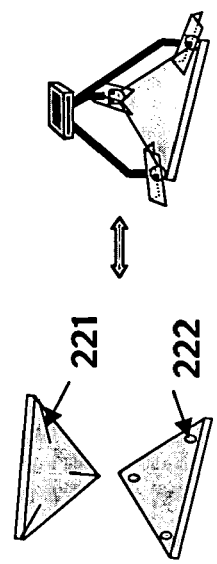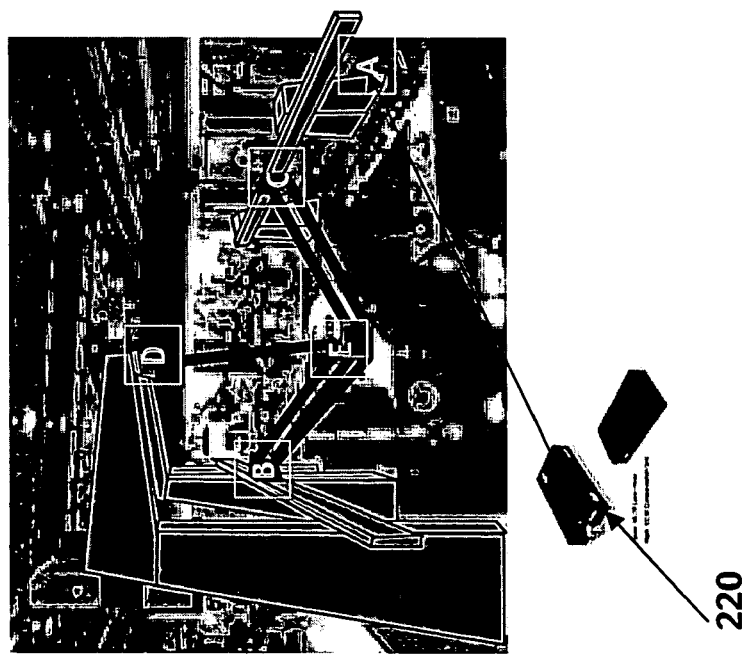
Fig. 43

INDUSTRIAL ROBOT

CROSS-REFERENCE TO RELATED APPLICATIONS

This application claims priority to U.S. provisional patent application 60/529,695 filed 16 Dec. 2003, U.S. provisional patent application 60/536,506 filed 15 Jan. 2004, and U.S. provisional patent application 60/578,322 10 Jun. 2004.

FIELD OF THE INVENTION

The present invention relates to an industrial robot. Such a robot includes a manipulator and control equipment for moving an object in space. The manipulator includes a parallel kinematic manipulator including at least three arms, each including a link arrangement. The manipulator includes a platform jointly supported by the three arms. Each arm is associated with an actuator with the purpose of moving the links of the arm such that a movement of the platform is attained. The task of the platform is to directly or indirectly support tools or objects, large as well as small, for movement, measurement, processing, working, joining, etc. In particular, the manipulator is intended to be used in the manufacturing industry but also transfer of goods and passageways for passengers in harbours and airports may come into question.

The invention also relates to a method for reconfiguration of an industrial robot according to the invention.

PRIOR ART

An industrial robot includes a manipulator and a control unit having means for automatically operating the manipulator. There are different types of manipulators, such as a serial kinematic manipulator and a parallel kinematic manipulator.

A parallel kinematic manipulator (PKM) is defined as a manipulator including at least one stationary element, a movable element, denoted a platform, and at least three arms. Each arm includes a link arrangement connected to the movable platform. Each arm is actuated by a driving means preferably arranged on the stationary element to reduce the moving mass. These link arrangements transfer forces to the movable platform. For a fully built-up parallel kinematic manipulator for movement of the platform with three degrees of freedom, e.g. in directions x, y and z in a Cartesian system of coordinates, three parallel-working arms are required. To obtain a stiff arm system with a large loading capacity and a low weight, the arms of the parallel kinematic manipulator should have a total of six links. This means that the arms must share the six links between them, and this can only be done with certain combinations.

When a rectangular workspace is required in manipulator applications, so-called gantry manipulators are used today. These manipulate a platform with normally four degrees of freedom: x, y, z and rotation around the z-axis. These manipulators are composed of one axis of rotation and three series-connected linear paths, on which movable units are moved in the x-, y- and z-directions.

The international patent application WO02/34480 discloses an industrial robot of gantry type including a platform arranged for carrying an object, a first arm arranged for influencing the platform in a first movement and including a first actuator having a first path and a first carriage linearly movable along the first path, and at least two links, each of which includes an outer joint arranged in the platform and an inner joint arranged in the first carriage, a second arm arranged for influencing the platform in a second movement and including a second actuator, having a second path and a second carriage linearly movable along the second path, and two links, each of which includes an outer joint arranged in the platform and an inner joint arranged in the second carriage, and a third arm arranged for influencing the platform in a third movement and including a third actuator and at least one link, which includes an outer joint arranged in the platform and an inner joint connected to the third actuator. The arm supports an axis of rotation when the manipulator has four degrees of freedom.

In this document a robot is disclosed for which the arms share the six links between them in a combinations 3/2/1. To achieve a constant angle of rotation of the platform the three links of the first arm are arranged in parallel and so that the links form a parallelogram. Such a prior art robot is shown in FIG. 1 of the present application. The workspace obtained with the robot in FIG. 1 is shown in FIG. 2. As shown in FIG. 2 the workspace of the robot is limited to only a part of the area between the linear paths. In particular, the workspace is very limited compare to the total space occupied by the robot including the linear paths. However, in many industrial applications there is a desire to have a larger workspace. In particular, there is a desire to be able to utilize most of the area between the first and second linear path.

OBJECTS AND SUMMARY OF THE INVENTION

The object of the present invention is to provide an industrial robot including a parallel kinematic manipulator, which meets the above-mentioned desires regarding an increased workspace in relation to the size of the robot.

This object may be achieved by the industrial robot according to an embodiment of the present invention that includes:

a platform arranged for carrying the object, a first arm arranged for influencing the platform in a first movement and including a first actuator having a first path and a first carriage linearly movable along the first path, and a first and a second link, each link including an outer joint connected to the platform and an inner joint connected to the first carriage, a second arm arranged for influencing the platform in a second movement, including a second actuator having a second path and a second carriage linearly movable along the first path, and two links, each link including an outer joint connected to the platform and an inner joint connected to the second carriage, a third arm arranged for influencing the platform in a third movement, including a third actuator and at least one link including an outer joint connected to the platform and an inner joint connected to the third actuator, and a control unit controlling the movements of the platform, wherein the first arm is arranged rotatable about at least one axis perpendicular to a first plane including the first and second path, the second arm is arranged rotatable about at least one axis perpendicular to the first plane, the first and second arm are arranged rotatable in such way that the platform is movable between opposite sides of a second plane perpendicular to the first plane and passing through and continuously following the first and second carriage, and the control unit includes control means adapted to upon command perform a reconfiguration of the platform and the arms of the robot, wherein the reconfiguration includes moving the platform between opposite sides of the second plane.

According to the invention the robot is arranged in such way that it is possible to move the platform and the link arrangement between opposite sides of a plane perpendicular to a plane including the first and second path and passing through the first and second carriage. Such a robot is reconfigurable, which means that it possible for the robot to work in both directions between the linear paths. Thanks to the fact that the robot is reconfigurable, an increased workspace is achieved. The workspace extends outside the extension of the linear paths on two sides. Thus, a large workspace is achieved in relation to the size of the robot.

According to an embodiment of the invention the first link of the first arm is arranged with its longitudinal axis non-parallel to the longitudinal axis of the second link of the first arm. In this embodiment the first arm does not have any internal singularity in the workspace. The stiffness with respect to platform rotations about an axis perpendicular to the plane including the first and second path will be the same everywhere in the workspace.

According to an embodiment of the invention the distance between the inner joint of the first link, and the inner joint of the second link is shorter than the distance between the outer joint of the first link and the outer joint of the second link. The forces on the link arrangement decrease as the distance between the outer joints increases. Thus, this embodiment reduces the forces on the links of the first arm.

According to an embodiment of the invention the inner joints of the first and second link of the first arm are arranged at a distance from each other in a direction perpendicular to the first plane. Accordingly, a larger workspace is achieved since collisions between the links are avoided and thus it is possible for the platform to move closer to the first path.

According to an embodiment of the invention the inner joints of the first and second link of the first arm are arranged along a common line, which is perpendicular to the first plane. This embodiment simplifies the kinematic calculations during control of the motion of the robot.

According to an embodiment of the invention the first arm includes a third link including an outer joint connected to the platform and an inner joint connected to the first carriage. The third link makes it possible to maintain a constant tilt angle of the platform during operation. This is advantageous in several applications for which it is important to keep the tool in a constant angle relative to a work object, for example during drilling, grinding, milling, polishing, cutting, gluing and welding on a flat object.

According to an embodiment of the invention the inner joint of the third link is also arranged along the line. This embodiment further simplifies the kinematic calculations during control of the motion of the robot.

According to an embodiment of the invention the inner joints of the second arm are arranged along a line, which is parallel to the common line along which the joints of the first arm are arranged. Thus, the platform is locked from rotation about both the x-axis and y-axis, which means that it will have a constant tilt angle.

According to an embodiment of the invention the inner joint of the first link and the inner joint of the second link is a common joint. The number of joints is then reduced, and thus a cheaper robot is achieved.

According to an embodiment of the invention one of the links are provided with a locking mechanism, which upon activation prevents the link from rotating about its longitudinal axis. Preferably, the locking device is arranged to prevent the link from rotating about its longitudinal axis when the robot passes through a singularity during reconfiguration. This embodiment prevents the platform from uncontrolled tilting when the robot passes through a singularity during reconfiguration.

According to an embodiment of the invention both the inner and outer joint of one of the links are arranged movable in only two degrees of freedom, and the one link is provided with a play arranged to take care of minor rotary movements about the longitudinal axis of the link. This embodiment also prevents the platform from uncontrolled tilting when the robot passes through a singularity during reconfiguration.

According to an embodiment of the invention the link of the third arm is provided with a locking unit having a locked state, in which the link is fixed relative to its inner joint, and an unlocked state, in which the link is allowed to move in relation to its inner joint in a direction along the longitudinal axis of the link. This embodiment prevents the platform from moving deep in the z-direction during reconfiguration of the third arm.

According to an embodiment of the invention the link of the third arm is arranged with an adjustable length, and the third arm includes an actuator adapted to control the length of the link. This is an alternative embodiment, which also prevents the platform from moving deep in the z-direction during reconfiguration of the third arm.

According to an embodiment of the invention one of the links of the first or second arm is provided with a locking member, which upon activation prevents the link from moving in a direction perpendicular to a plane passing the first and second paths. Preferably, the locking member is arranged to lock one of the joints of the link provided with the locking member, from rotating about an axis in a direction parallel to a plane passing the first and second paths. This embodiment makes it possible to prevent the platform from moving uncontrollable when the locking unit of the link of the third arm is released, especially when the robot is mounted in such a way that the plane passing the first and second paths is perpendicular to the gravity direction.

According to an embodiment of the invention the two links of the second arm have essentially the same length and are arranged with their longitudinal axes in parallel. This embodiment keeps the platform locked from rotation about at least one of the x-axis and y-axis, which means that it will have a constant tilt angle.

According to an embodiment of the invention at least two of the links of the first arm are arranged so that they, from at least one point of view, are in parallel. Preferably, at least two of the links of the first arm have essentially the same length. This embodiment keeps the platform locked from rotation about both x-axis and y-axis, which means that it will have a constant tilt angle.

According to an embodiment of the invention the first, second and third link are arranged so that they, from at least one point of view, are in parallel. Such a robot is easy to build.

Another object of the invention is to provide a method for reconfiguration of an industrial robot according to the present invention. This object may be achieved with a method for reconfiguration of an industrial robot including a platform arranged for carrying an object, a first arm arranged for influencing the platform in a first movement, including a first actuator having a first path and a first carriage linearly movable along the first path, and at least two links, each link including an outer joint connected to the platform and an inner joint connected to the first carriage, a second arm arranged for influencing the platform in a second movement, including a second actuator having a second path and a second carriage linearly movable along the first path, and at least two links, each link including an outer joint connected to the platform and an inner joint connected to the second carriage, and a third arm arranged for influencing the platform in a third movement, and the first and second arm are arranged movable in such way that the platform is movable between opposite sides of a second plane passing through and continuously following the first and second carriage and perpendicular to a first plane including the first and second path, wherein the robot is in a first position, in which the platform is positioned on a first side of the second plane passing through the first and second carriage, and the method including:

moving the robot to a second position by moving at least the first and second arm relative each other until the platform is positioned close to the second plane, moving the robot to a third position by moving at least the third arm so that the first and second arm coincide with the second plane, and moving the robot to a fourth position by moving at least the third arm so that the platform is positioned on a second side of the second plane.

According to an embodiment of the invention the method includes moving the first and second carriage relative each other until the robot reaches the second position, locking one of the links from rotating about its longitudinal axis, moving the first and second carriage relative each other until the robot reaches the third position, and moving the first and second carriage relative each other until it reaches the fourth position, and releasing the locking of one of the links from rotating about its longitudinal axis. Moving the first and second carriage relative each other means that either only the first carriage is moved, or only the second carriage is moved, or both the first and second carriage are moved, or at least one of the first and second carriage, and the third carriage are moved. This embodiment prevents the platform from uncontrolled tilting when the robot passes through a singularity during reconfiguration.

According to an embodiment of the invention, when the robot is in the first position, the inner joint of the link of the third arm is positioned on a first side of a third plane perpendicular to the first and second path, and passing through and continuously following the platform, and the method further includes: keeping the link of the third arm in a fixed relation to its inner joint until the robot has passed the third position, and when the robot has passed the third position, locking one of the links of the first or second arm from moving in a direction perpendicular to a plane passing the first and second paths, allowing the link of the third arm to move in relation to its inner joint in a direction along the longitudinal axes of the link, moving the inner joint of the link of the third arm to the second side of the third plane, locking the link of the third arm in a fixed relation to its inner joint, and releasing the locking of one of the links of the first or second arm from moving in a direction perpendicular to a plane passing the first and second paths. This embodiment of the invention prevents the platform from moving deep in the z-direction during reconfiguration of the third arm and also prevents the platform from falling down because of gravity when the locking of the link of the third arm is released and the robot is mounted with the mentioned plane perpendicular to the gravity direction.

According to an embodiment of the invention, the movements of at least one of the first and second arm are controlled by a compliant servo control during passage of the third position of the robot. Thus, the demand on the accuracy of the control is reduced during passage through the singular position.

According to an aspect of the invention, the object is achieved by a computer program directly loadable into the internal memory of a computer or a processor, including software code portions for performing the steps of the method according to the invention, when the program is run on a computer. The computer program is provided either on a computer readable medium or through a network, such as the Internet.

According to another aspect of the invention, the object is achieved by a computer readable medium having a program recorded thereon, when the program is to make a computer perform the steps of the method according to the invention, and the program is run on the computer.

Software for performing the reconfiguration is preferably stored in and executed by the control unit of the robot.

BRIEF DESCRIPTION OF THE DRAWINGS

The invention will now be explained more closely by the description of different embodiments of the invention and with reference to the appended figures.

FIGS. 21-44 shows a number of different embodiments of a parallel kinematic manipulator.

DETAILED DESCRIPTION OF PREFERRED EMBODIMENTS OF THE INVENTION

Figure 1:
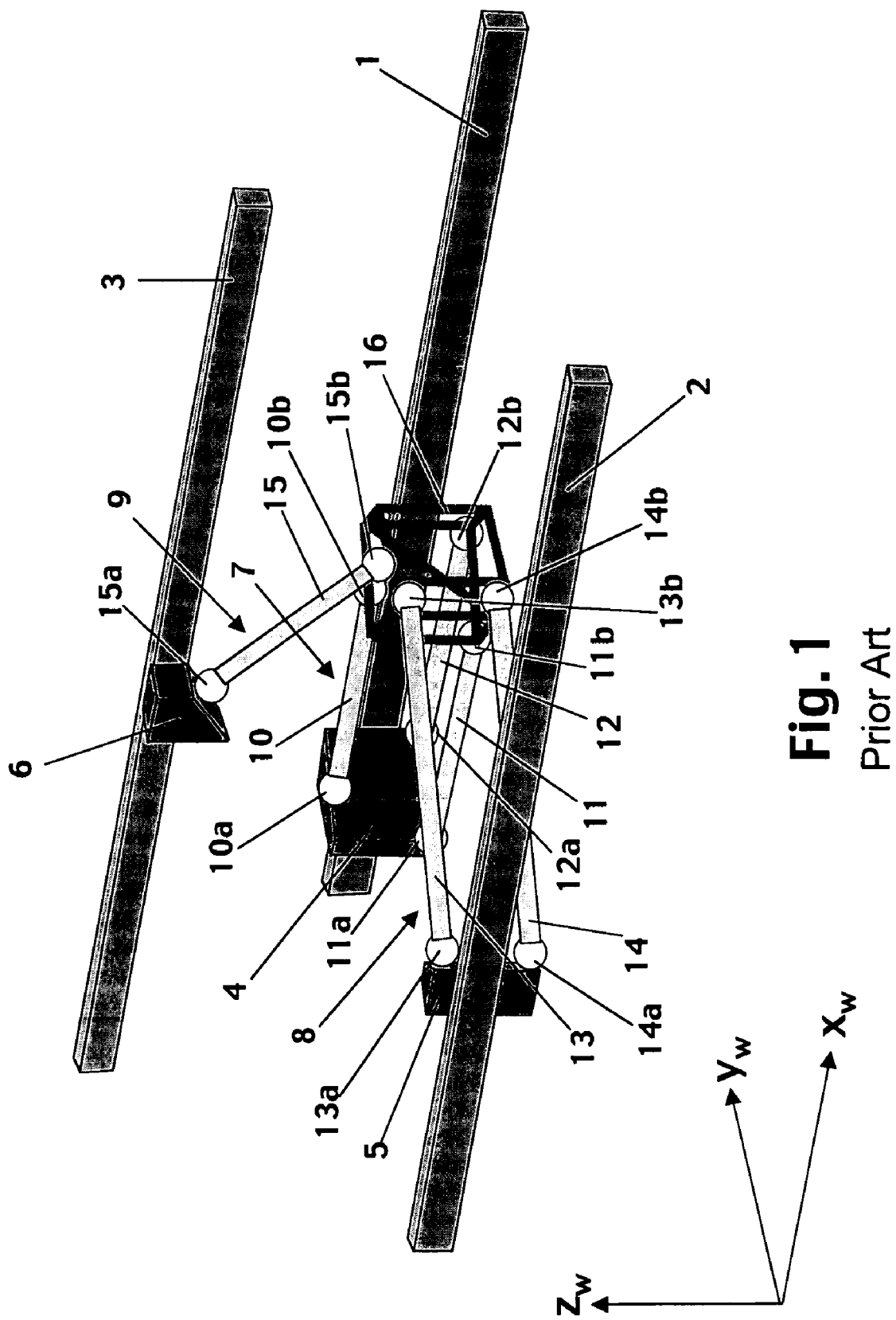
FIG. 1 shows a prior art design of a gantry type of parallel kinematic manipulator

FIG. 1 shows a prior art design of a gantry type of parallel kinematic manipulator (PKM) having a rather big workspace, but which cannot make a full reconfiguration to work in both directions between the linear paths. The PKM includes two paths 1 and 2, which together define a plane parallel to the $x_w y_w$-plane of the world coordinate system shown in the figure. On path 1 there is a carriage 4, which is actuated to move along path 1 by for example a motor-driven ball screw linear module, a motor-driven band transmission, a rack-and pinion drive, or a direct-driven linear motor. In the same way a carriage 5 is actuated along a path 2, and a carriage 6 along a path 3. The path 6 is parallel with the paths 1 and 2 and forms a triangular geometry in the $y_w z_w$-plane together with the paths 1 and 2. Each carriage is connected to an actuated platform 16 by means of an arm, the carriage 4 with a first arm 7, the carriage 5 with a second arm 8 and the carriage 6 with a third arm 9. The first arm 7 consists of three parallel links 10, 11, 12. These links have the same length and at each end of the links there is a joint. Thus, the link 10 has an inner joint 10a and an outer joint 10b, the link 11 has an inner joint 11a and an outer joint 11b, and the link 12 has an inner joint 12a and an outer joint 12b. The arm 8 consists of two parallel links 13 and 14 with equal length and in the same way as for the arm 7 these links have an inner and an outer joint, 13a and 13b for link 13 and 14a and 14b for link 14. Finally, the arm 9 consists of only one link 15 with an inner joint 15a and an outer joint 15b. For a not redundant mechanical assembly of the arm structure of the manipulator at least one of the inner and outer joint for each link must have three degrees of freedom, in the following denoted DOF, while the other joint must have at least 2 DOF. To minimize the weight of the actuated platform when using universal joints, it is an advantage to have 2 DOF for the outer joints and 3 DOF for the inner joints.

Figure 2:
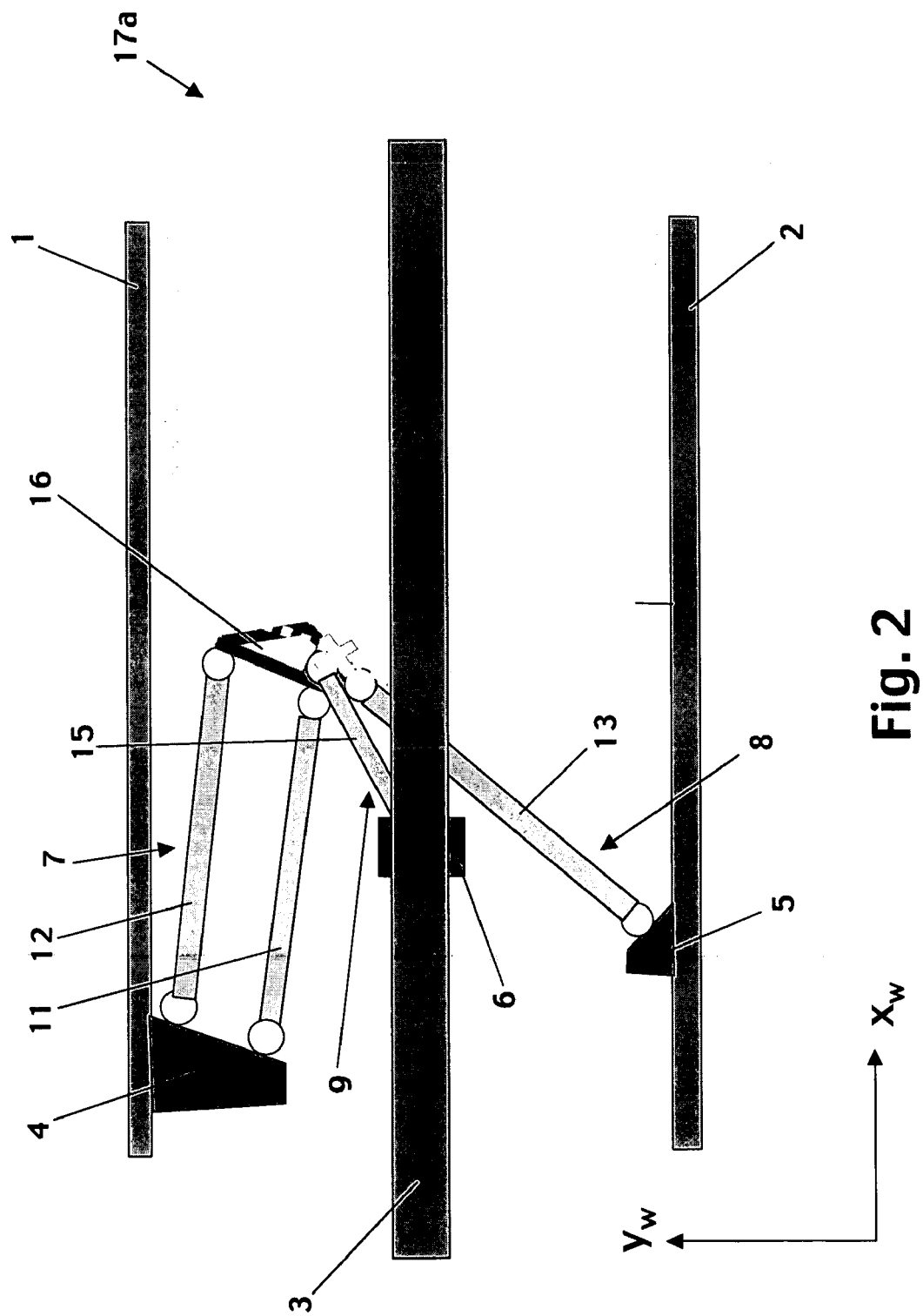
FIG. 2 shows the manipulator in FIG. 1 in a view from above.

FIG. 2 shows the manipulator in FIG. 1 from above with the paths 1 and 2 forming a plane parallel with the $x_w y_w$-plane. This figure is included to show the workspace for the actuated platform in the $x_w y_w$-plane. The workspace is limited by the broken line 17a and as can be seen almost half of the space between the paths 1 and 2 cannot be reached by the actuated platform 16. To be able to reach this space a reconfiguration of the arm structure is needed, which means that the carriages are actuated in such a way that the arms go from manipulation of the actuated platform 16 to the right of the carriages in the figure to the left of the carriages in the figure.

Figure 3:
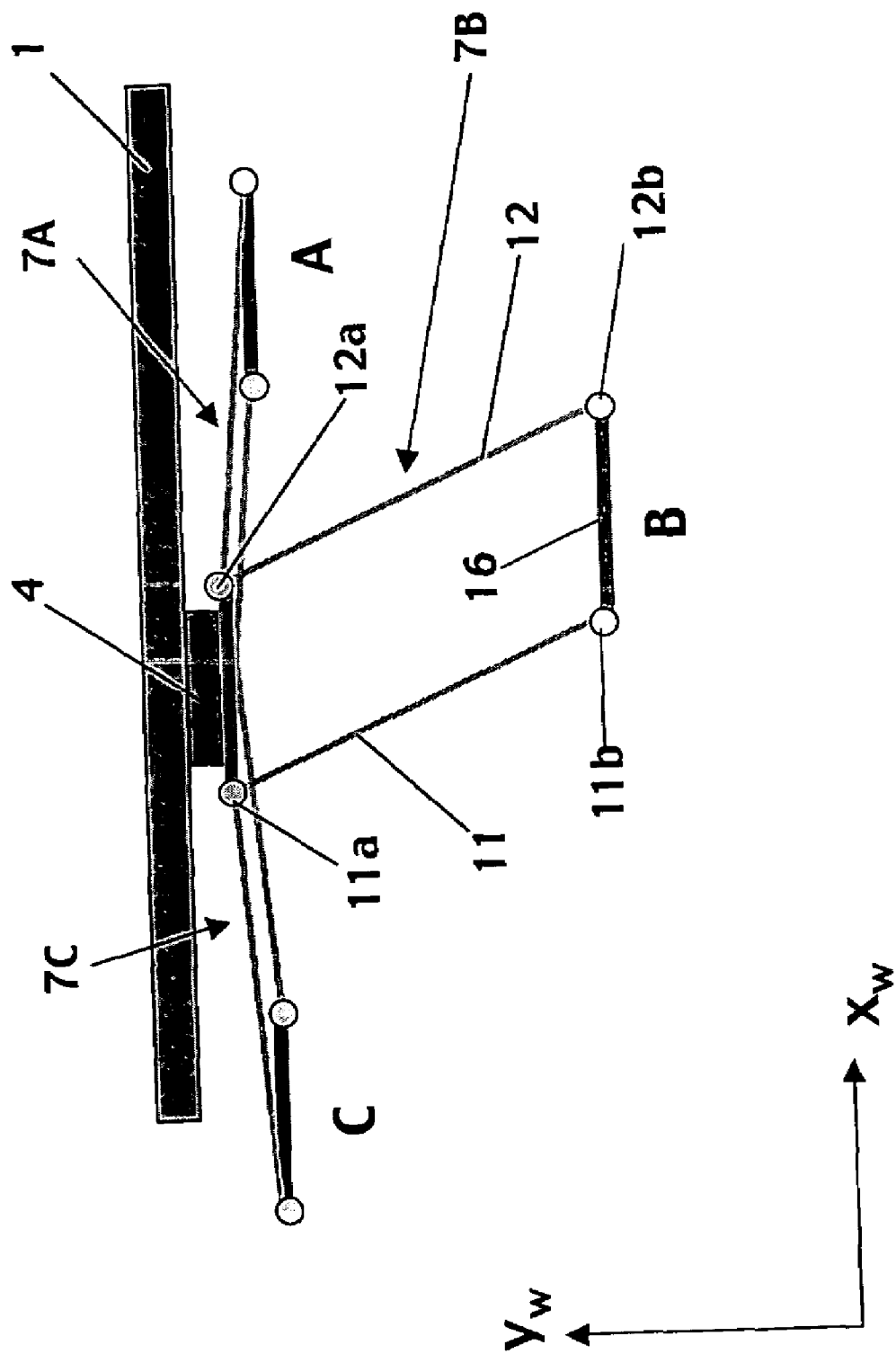
FIG. 3 shows an arm of a manipulator according to a first embodiment of the invention.

To make the reconfiguration possible the links 11 and 12 in FIG. 2 must be mounted on the carriage 4 in another way. Thus, FIG. 3 shows schematically the links 11 and 12 with a mounting on the platform 4 in such a way that a line through the centres of the inner joints 11a and 12a is parallel with path 1. The arm 7 is arranged rotatable in such way that the platform 16 is movable between opposite sides of a plane through the carriage 4 and perpendicular to the path 1 and 2. With this mounting the links of arm 7 can swing the platform 16 to both sides of the carriage 4, exemplified with the platform 16 in a right configuration at A and B and in left configuration at C. The arm 7 will in these 3 positions have the internal configurations 7A, 7B and 7C. However, a problem with this design is that the internal configurations 7A and 7C are close to an internal singularity when the links 11 and 12 coincide. These internal configurations will give the manipulator a very low stiffness and with a requirement of 30 degrees or more between the longitude axis of links 11 and 12 in relation to the line through the joints 11a and 12a for high stiffness, the workspace will be limited and cover only the lower part between the paths 1 and 2 in FIG. 2.

Figure 4:
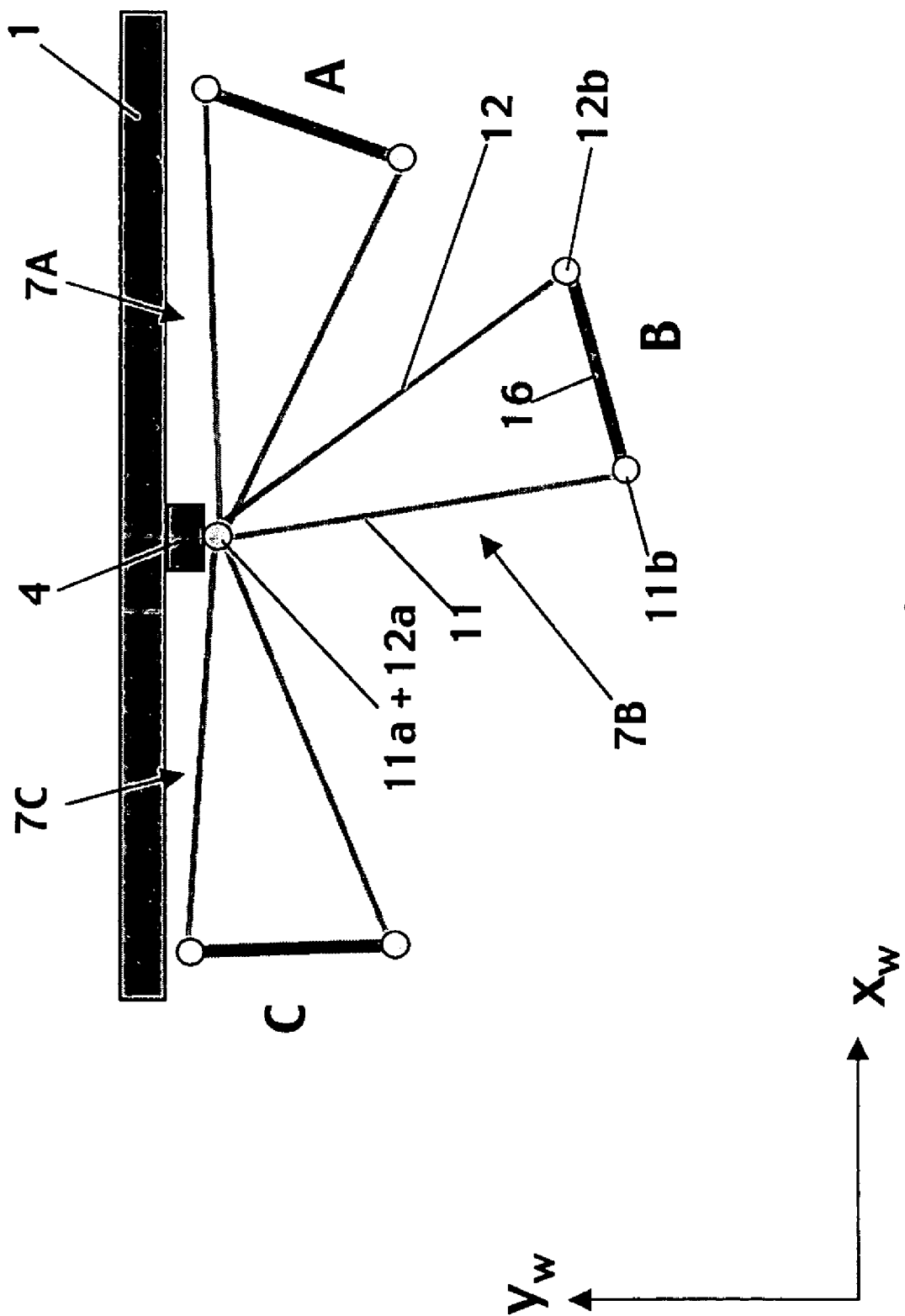
FIG. 4 shows an arm of a manipulator according to a second embodiment of the invention.

FIG. 4 shows the solution to the problem with the parallel link design in FIG. 3. Here the actuated platform 16 is connected to the carriage 4 with the links 11 and 12 forming a triangular shape as seen in the $x_w y_w$-plane. The first link 11 is arranged with its longitudinal axis non-parallel to the longitudinal axis of the second link 12. With this link configuration the internal arm configuration will be the same independent of where in the work-space the actuated platform 16 is positioned, meaning that the stiffness with respect to platform rotations around the $z_w$-axis will be the same everywhere in the works space between the paths 1 and 2. In the figure the joints 11a and 12a coincide, but a small offset between them in the $x_w y_w$-plane is allowed, even if the kinematic calculations will then be somewhat more complicated and the workspace a little reduced. One difference from FIG. 3 is that the actuated platform will now be rotated when it is manipulated in the workspace. However, this is a minor problem since the platform will have a wrist with at least one degree of freedom, whereby this rotation of the platform will be compensated by a counteracting wrist axis rotation.

Figure 5:
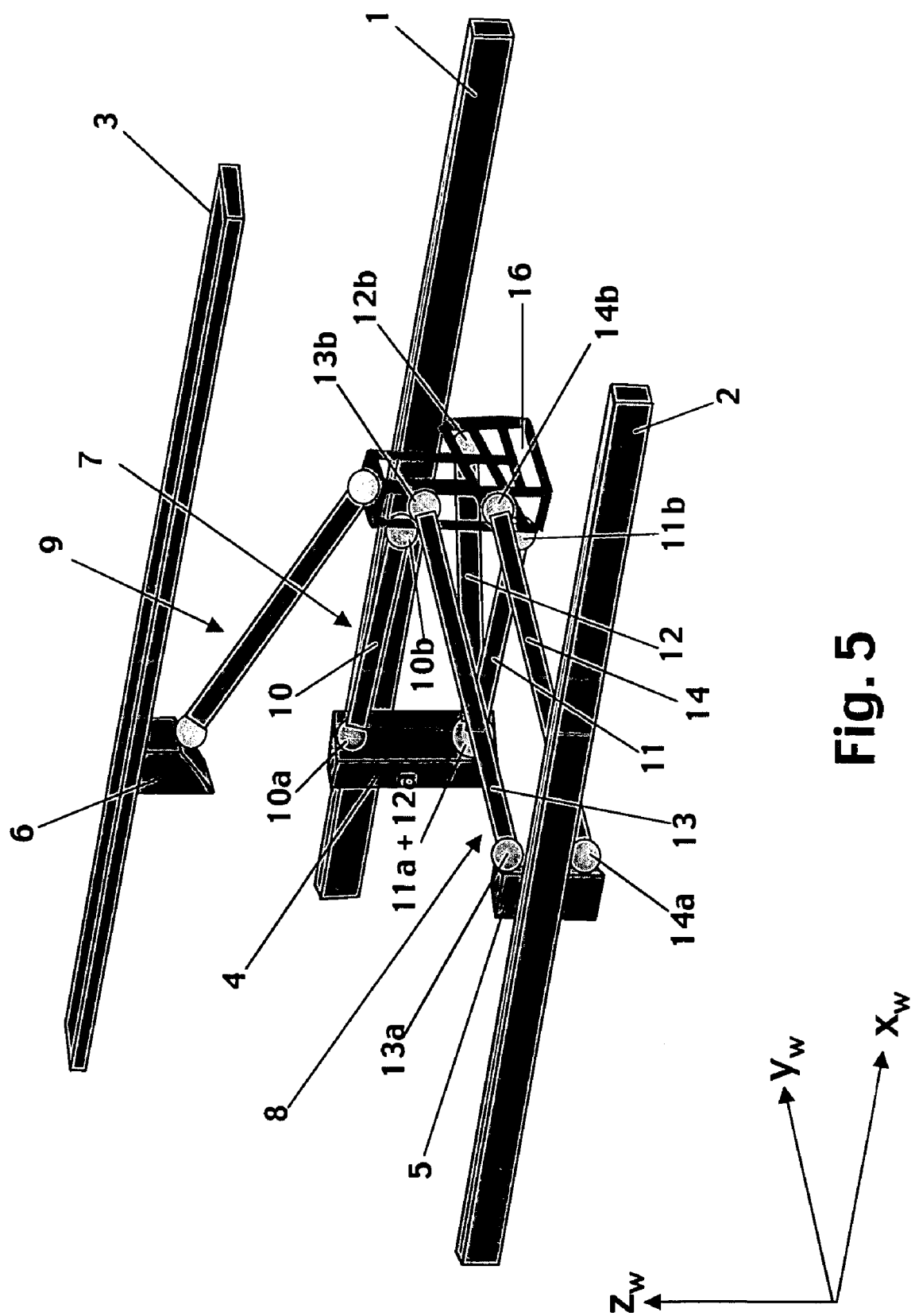
FIG. 5 shows the internal configuration of the arm according to FIG. 4 when assembled in the manipulator.

FIG. 5 shows the internal configuration of the arm 7 according to FIG. 4 when assembled in the manipulator. The actuated platform 16 is now given an L-shape with the joints 11b and 12b mounted on the horizontal part of the L and the joint 10b mounted on the vertical part of the L-shaped platform. The link 10 is mounted relative the links 11 and 12 in such a way that the tilt angle of the actuated platform will be constant all over the workspace. This means that if for example a drilling tool is mounted on the platform with the $z_w$-axis as the drilling direction, then the drilling will be made in this direction in the whole workspace in both the right and left configuration of the manipulator. To obtain this position independent tilt angle in the design of FIG. 5, link 10 is parallel with link 11 and the links 10 and 11 have the same length. Moreover, a line through the joints 10b and 11b, which line is parallel with a line through the joints 10a and 11a+11b, must be parallel with a line through the joints 13b and 14b and since the links 13 and 14 are parallel and of the same length, the line through joints 10b and 11b will also be parallel with a line through joints 13a and 14a.

The link 12 has the responsibility to take care of the torques around the $z_w$-axis of the actuated platform 16 and its mounting on the platform is not critical. However, the distance between joint 12b and the line through the joints 10b and 11b should be as big as possible to minimize the longitude axial force in link 12, but this distance will simultaneously make the actuated platform broader, which will reduce the platform stiffness and it will moreover reduce the workspace since the platform 16 will need a larger space between the linear paths 1 and 2 to avoid to collide with these.

If the distance between the inner joints 11a, 12a is shorter than the distance between the outer joints 11b, 12b of the links 11 and 12 the forces on the links decrease. The forces on the link arrangement decrease as the distance between the outer joints increases, but simultaneously the platform will increase in size and reduce the workspace between the first and second path 1,2. Thus, dependent on the application, a suitable distance between the outer joints is used.

Figure 6:
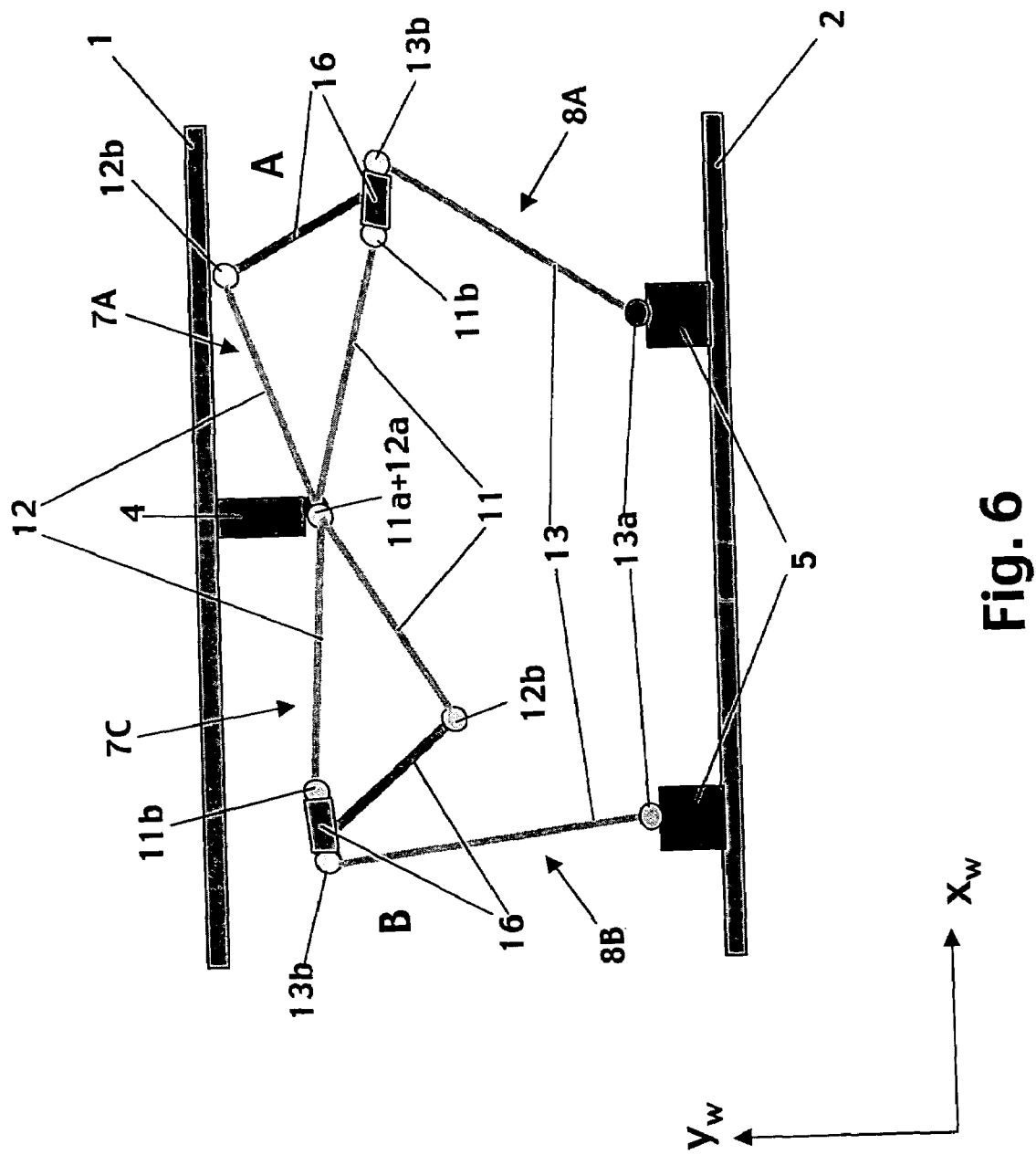
FIG. 6 shows the manipulator in FIG. 5 in two different configurations A and B.

The collision problem between the actuated platform 16 and the path 1 is evident from FIG. 6. Here the arms 7 and 8 are shown together with the platform in a view parallel to the $x_w y_w$-plane. In the manipulator configuration A it can be seen how the actuated platform movement is limited in the $y_w$-direction by the collision between the outer joint 12b and the path 1. However, in the opposite configuration B this problem does not occur and as a consequence the workspace will be larger in the $y_w$-direction when the robot works to the left in the figure (configuration B) than to the right (configuration A).

Figure 7:
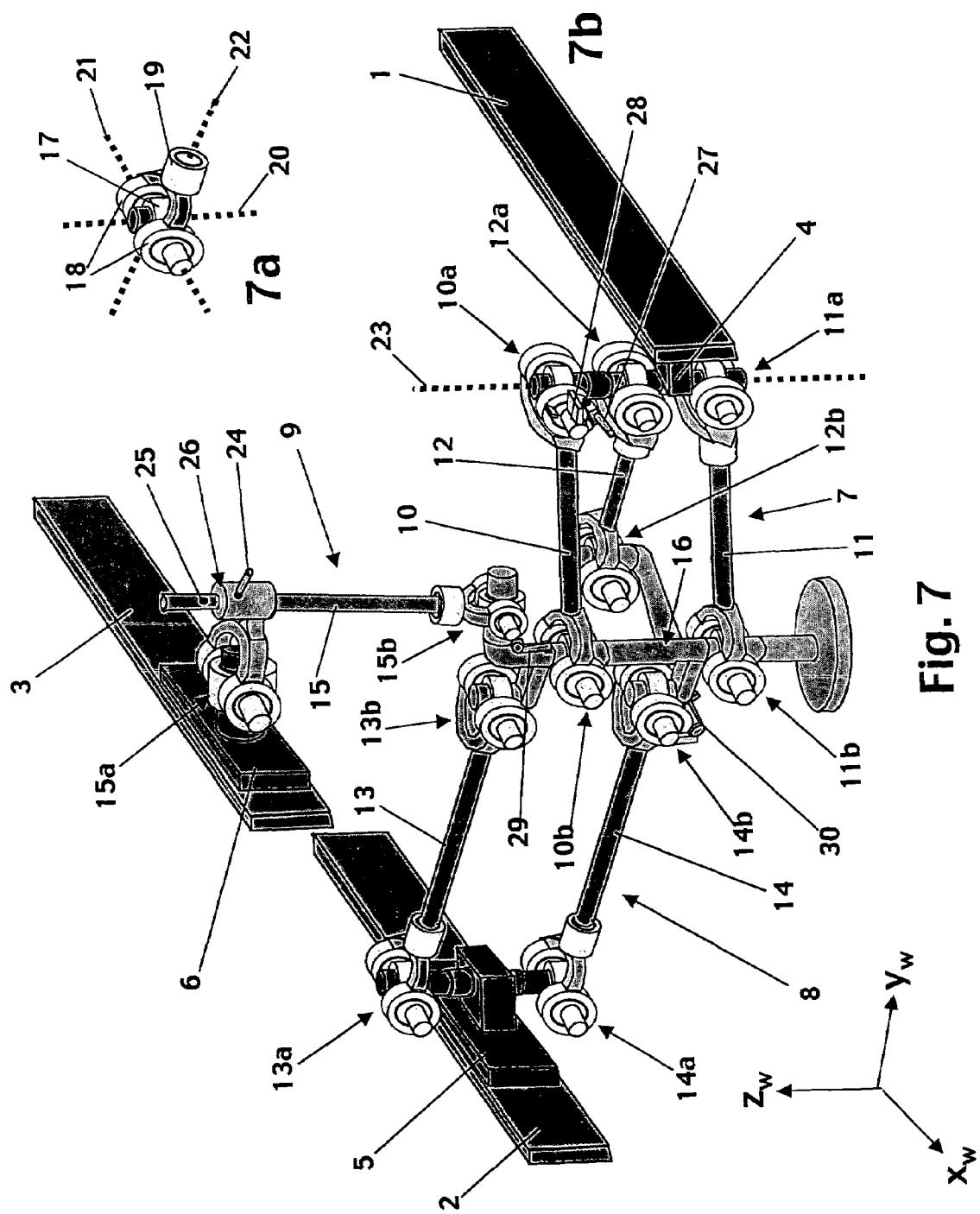
FIG. 7 shows an implementation of the manipulator in FIGS. 5 and 6.

FIG. 7 shows an implementation of the manipulator in the FIGS. 5 and 6. In FIG. 7a one of the universal joints is described with three rotating axes 20, 21 and 22. Axis 20 is given by a bearing 17, axis 21 by two in line bearings 18, and axis 22 by a bearing 19, which is mounted in such a way that axis 22 coincides with the symmetry axis of the link connected to the joint. For best performance the axes 20, 21 and 22 should be orthogonal to each other. For joints needing only 2 DOF, bearing 19 is not used. In FIG. 7b the bearing design of FIG. 7a is used for all the joints of the manipulator. As before, the manipulator is actuated by the three carriages 4, 5 and 6, which are driven on three parallel paths 1, 2, 3 which form a triangle in the $y_w z_w$-plane. The arm 7 consists of three links 10, 11 and 12, with inner joints 10a, 11a and 12a and outer joints 10b, 11b and 12b. The axis 20 in FIG. 7a coincides for the inner joints 10a, 11a and 12a, forming a common axis 23 in the $z_w$-direction. The links 10 and 11 are parallel and of the same length and the link 12 forms an angle relative the links 10 and 11 as seen from above in the figure or more accurately described, in the projection of the arm 7 on the $x_w y_w$-plane. When the arm 7 is projected on a plane parallel with the $z_w$-axis, as for example the $y_w z_w$-plane, the links 10 and 11 must be parallel, but the link 12 does not need to be parallel to the links 10 and 11. Moreover, the link 12 does not need to have the same length as the links 10 and 11. As described earlier a prerequisite for this is that the axis 23 is parallel with the line passing through the centres of the joints 10a and 11a, the line through the joints 13b and 14b and the line through the joints 13a and 14a.

It should be stressed that joint 12b could have an offset both in the $x_w$-direction and the $y_w$-direction and with a big enough offset in any of these directions also an offset in the $z_w$-direction. However, an offset in for example the $x_w$-direction will give a more complicated rotation of the platform 16, making the kinematic calculations more difficult and with larger offsets the workspace of the robot will be reduced. In FIG. 7 also axis limiters 28, 29 and 30 are shown. These limiters will stop the manipulator when it reaches the boundaries of its workspace. Another detail is the adjustable link length arrangements for the link 15. This is implemented with a linear bearing 26, which can be locked by pushing the cylinder 24 into the link hole 25. As an alternative a mechanical break mechanism can be used to lock the linear bearing. Another locking mechanism can be seen for joint 10a, in which the bearing pair with horizontal axis can be locked by a cylinder 27. It can also be seen that both the joints 10a and 10b for the link 10 are only of 2 DOF. All of these special arrangements are implemented to be able to make a controlled transition of the manipulator between its two configurations.

Figure 8:
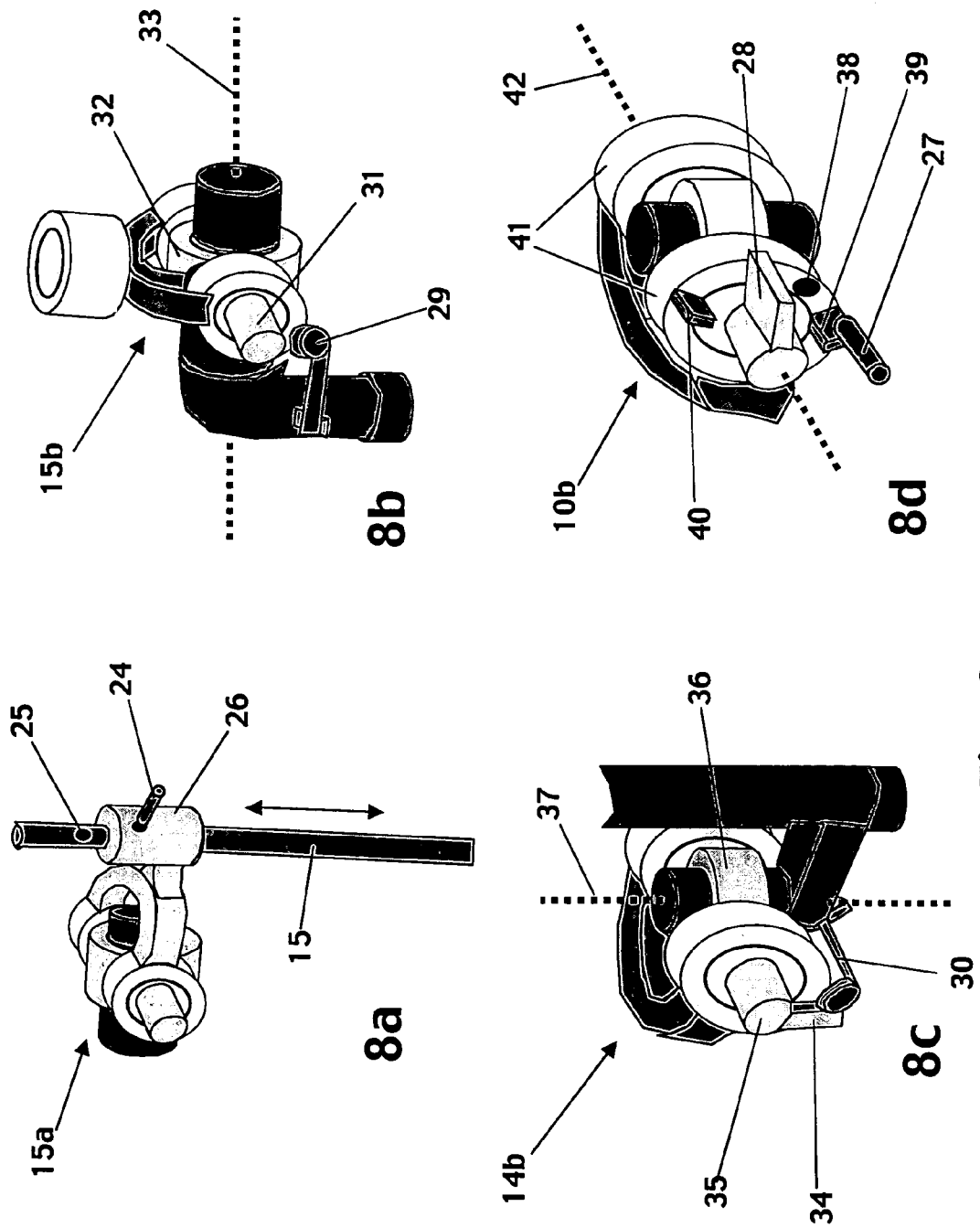
FIG. 8a-d shows different mechanisms for locking manipulator degrees of freedom and for limiting the workspace.

FIG. 8a-d shows in more detail the mechanisms for locking manipulator degrees of freedom and for limiting the workspace. Thus, FIG. 8a shows that the link 15 is provided with a locking unit 24, 26 having a locked state, in which the link 15 is fixed relative to its inner joint 15a, and an unlocked state, in which the link is allowed to move in relation to the joint 15a in a direction along the longitudinal axis of the link 15. The locking unit includes a linear bearing 26 that makes it possible for the link 15 to slide in relation to the joint 15a, with the intention to adapt the link length when the carriage 6 is moved to change the configuration of the third arm 9. During normal operation the link 15 is fixed relative the joint 15a, which is made by pressing a cylinder 24 into a hole 25 of the bearing 26. Of course several other locking mechanisms are possible, such as mechanical breaks, hydraulic clutches etc.

FIG. 8b shows a mechanical end stop concept for joint 15b. When a bearing 32 is rotated along an axis 33, a shaft 31 will move up and down and an end stop 29 will be engaged when the shaft 31 has moved to a position where the shaft 31 hits the end stop 29. A corresponding end stop can be used on the other side of the joint 15b to limit the working range for the bearing 32 in both rotation directions. The purpose of this end-stop is to give restrictions for the movement of the third carriage 6 and can also be used to indicate the angle of link 15 when this link is controlled to change its configuration. A corresponding end stop mechanism is shown in FIG. 8c. In this case the working range of a bearing 36 when rotating around an axis 37 is limited by an end stop 30. With this end stop 30 the angle between the arms 7 and 8 will be supervised. When these arms are controlled to change their configuration, this end stop 30 can be used to supervise the configuration transfer and to indicate when the robot has reached its singularity when the arms 7 and 8 are parallel. This end stop 30 could as well be mounted on joint 13.

FIG. 8d shows a locking member for locking the joint 10b including a bearing pair 41. The locking member includes a cylinder 27 and flange 28. Here the bearing pair 41 is locked not to pass the flange 28 by means of the cylinder 27, which is inserted into a hole 38 in one of the bearings 41. This is made before the linear bearing 26 in FIG. 8a is released to guarantee that the platform 16 will not move in a direction perpendicular to a plane passing the first and second paths when then the linear bearing 26 is released. When this release is made, and the cylinder 27 has been inserted into hole 38, the cylinder 27 will prevent the bearing pair 41 to pass the flange 28 and the manipulator will be locked in the zw-direction. In normal operation the cylinder 27 will not be used to lock the bearing pair 41.

FIG. 8d also shows a workspace limiting mechanism including end stops 39 and 40 mounted on one of the bearings 41, which works in the same way as the locking member 27, 38. Thus, the bearing pair 41, which rotates round an axis 42, is limited by the end stops 39 and 40. When the arm 7 moves downwards (see FIG. 7) the end stop 39 will eventually hit the flange 28, and the movement will be stopped, and when the arm 7 moves upwards it will be stopped when the end stop 40 hits the flange 28. The flange 28 is fixed to the inner bearing between the bearing pair 41 and the end stops 39 and 40 are mounted on the outer rotating part of the bearing 41. The end stops 39 and 40 could be mechanical end stops or electrical switches. This end stop mechanism prevents the manipulator from falls down when the locking unit 24, 26 at joint 15a is released and can also be integrated into any of the joints 11a, 12a, 10b, 11b, 12b, 13a, 14a, 13b or 14b.

Figure 9:
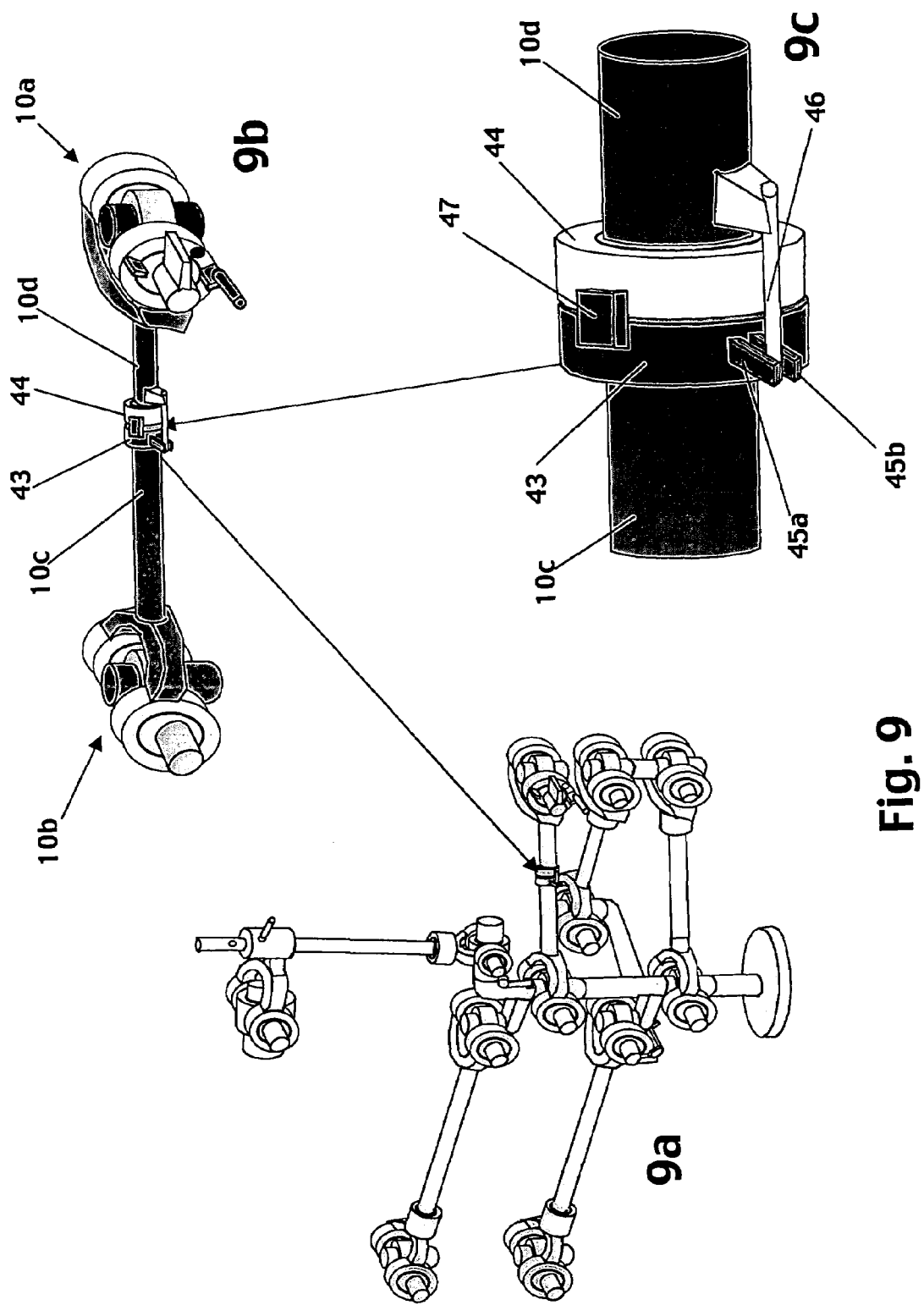
FIG. 9 shows the manipulator of FIG. 7 provided with a locking device to be used when the robot passes through a singularity during reconfiguration.

As can be seen in FIG. 7 the link 10 has a 2 DOF joint both for the inner joint 10a and for the outer joint 10b. The reason for this is that when the link structure passes the singularity during a reconfiguration, then the platform 16 will gain one DOF and it will tilt without any control if all links have at least one joint with 3 DOF. However, if one link has only 2 DOF in both of its joints, then this link can transmit twist torque to the carriage and prevent the uncontrolled tilting of the platform 16. However, having 2 DOF joints in both ends of a link will give a redundant mechanical assembly and internal forces and torques will be built into the structure when it is assembled. When a very stiff manipulator is assembled for such an application as material removal, the stress on the components can be very high leading to large friction levels and reduced the life time. In FIG. 9 a solution to this problem can be found.

FIG. 9a shows the same manipulator as in FIG. 7 and FIG. 9b shows the link 10 with provided with a play to take care of the small rotation around the centre axis of link 10 that occur because of small geometry errors in the arm components when these are assembled to a complete arm structure. This small rotation around the centre axis of link 10 will also release the stress in the arm structure because of changes in temperature. Thus, link 10a is divided into two link parts 10c and 10d and between these link parts there is a bearing 44 with its axis of rotation coinciding with the centre axis of link parts 10c and 10d.

FIG. 9c shows the bearing arrangement in more detail. The link part 10c has a larger diameter section 43 with a locking device having two end stops 45a and 45b very close to each other. An outer rotating part of the bearing 44 is connected to section 43 with a bridge 47, which means that the link part 10d can rotate relative the link part 10c. However, this rotation in limited by the end stops 45a and 45b, since a cylinder 46 mounted on the link part 10d is restricted between the end stops 45a and 45b, thus forming a rotation play between link parts 10c and 10d. This play is designed to take care of the relative link part rotations needed to compensate for the geometry errors in the arm structure. When the arm structure is in its singularity the cylinder 46 will be moved either towards end stop 45a or 45b dependent on the torque direction caused by the gravity when the robot starts tilting in the singularity. In the figure this arrangement is located almost in the middle of the first arm 9 for clarity, but in a good design it should be as close as possible to the inner joint 10a.

Figure 10:
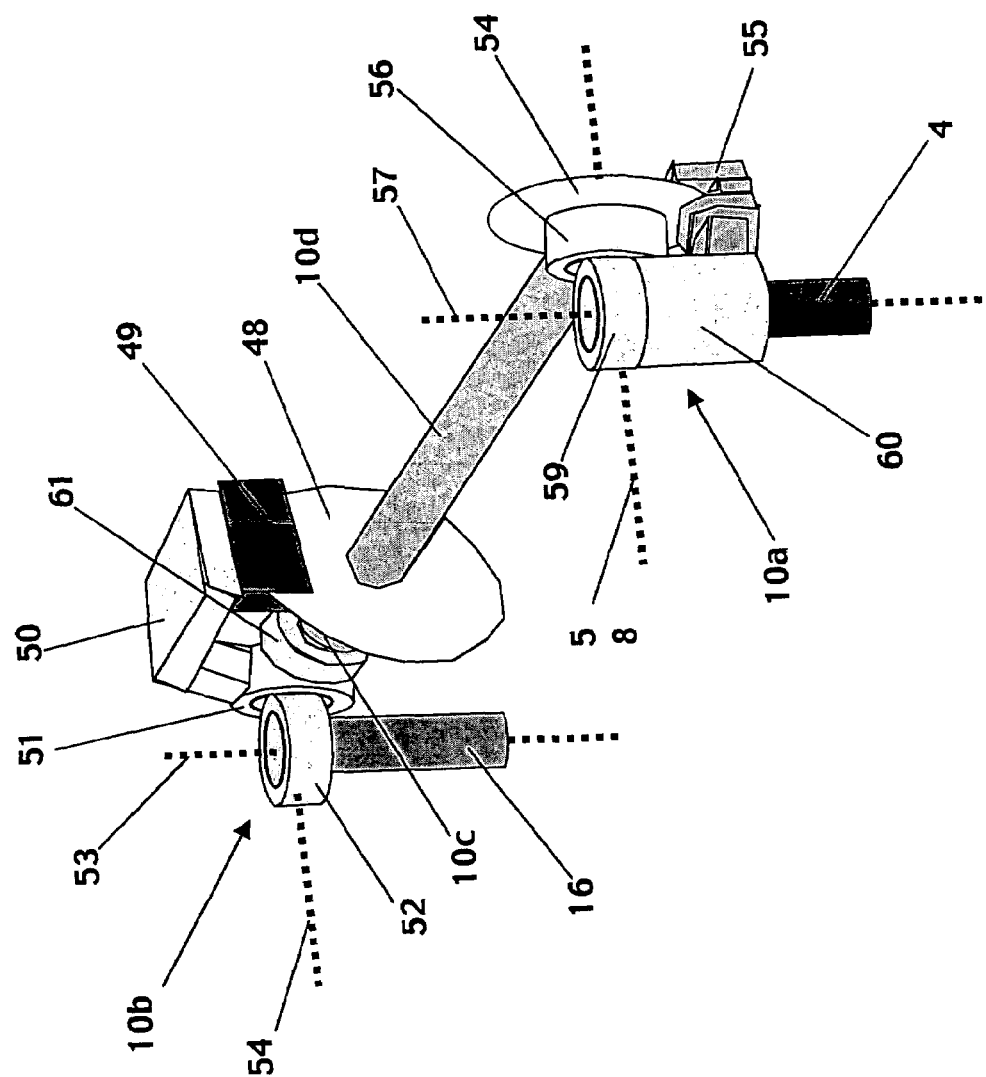
FIG. 10 shows an alternative solution to locking the rotation of a link when passing a singularity.

FIG. 10 shows an alternative solution to locking the rotation of a link when passing a singularity and locking a joint to avoid that the actuated platform falls down when the linear bearing 26 is released. Thus, mechanical disc brakes 48, 49 and 54, 55 are used in this case. When the arm structure passes the singularity a clamping device 49 clamps to the brake disc 48, locking the link part 10c to the link part 10d. The clamping device 49 is mounted on a bearing 51 with a centre line of rotation 54. The primary part of the bearing 51 is mounted on a bearing 52 with a centre line of rotation 53. The primary part of the bearing 52 is mounted on the actuated platform 16. When the arm structure has passed the singularity the brake 48, 49 is released and the manipulator works without any assembly redundancy, since the link parts 10c and 10d then can rotate in relation to each other because of the bearing 61.

In a similar way a disc brake 54, 55 is used to hold up the actuated platform when the first arm 9 moves from one configuration to another during which the linear bearing 26 is released. The joint 10a includes two bearings 56 and 59. A disc 54 is mounted on the secondary rotating part of the bearing 56 and will thus rotate around a rotation centre axis 58 of the bearing 56. Before the linear bearing 26 is released a clamping device 55 is activated and the bearing 56 is locked. The clamping device 55 is mounted on a hollow cylinder 60, which is mounted on a secondary (outer) rotating part of the bearing 59. The bearing 59 has a rotation axis 57 and its inner part is mounted on the carriage 4. It should be mentioned that in the same way as clamping of rotating braking discs are used in this figure a linear rectangular braking sheet of metal can be used for the linear bearing 26 to clamp the link 15 to the bearing part 26.

Figure 11:
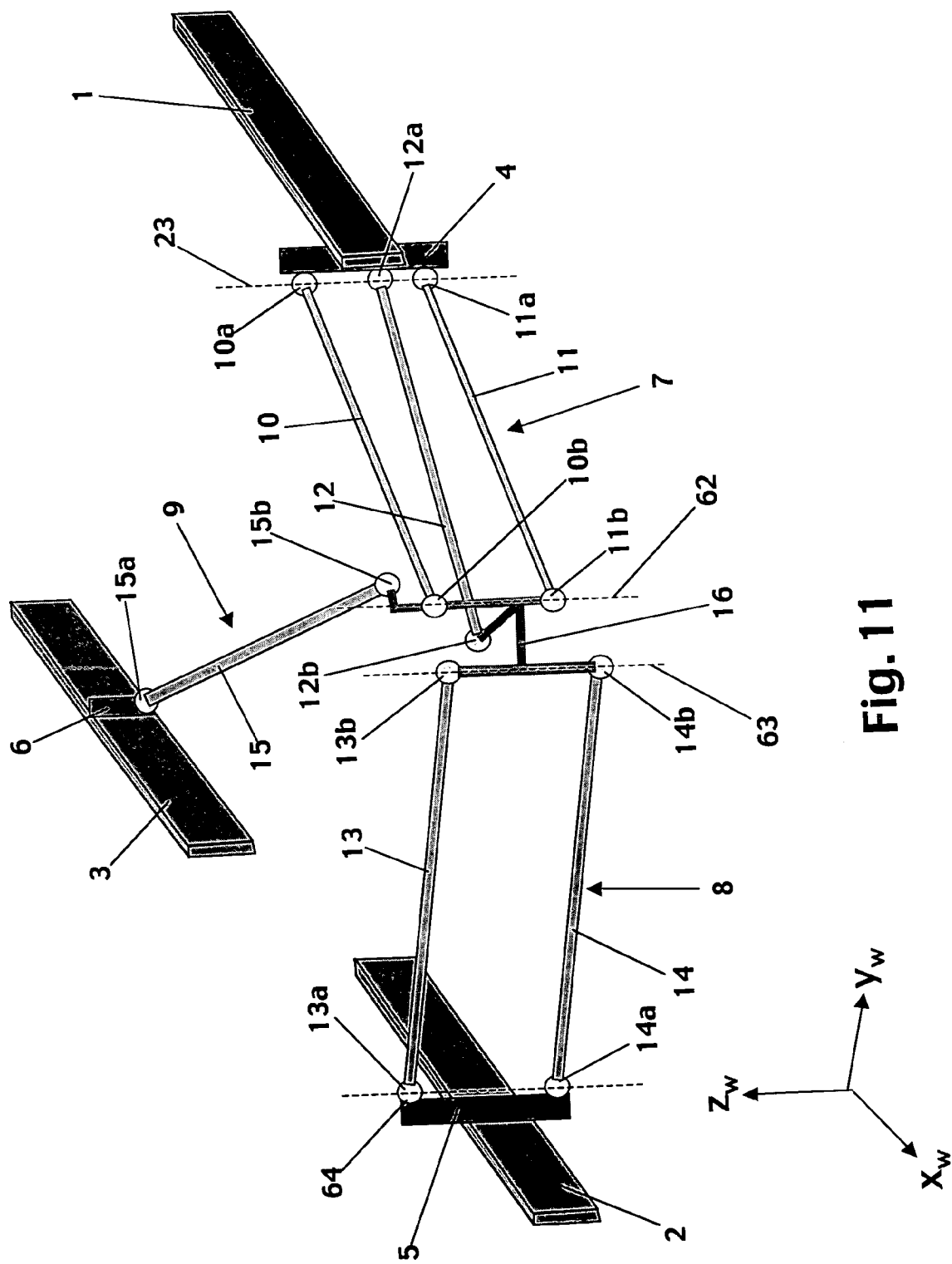
FIG. 11 is a schematic drawing of the manipulator in FIG. 7.

FIG. 11 is a schematic drawing of the manipulator structure in FIG. 7, to be used to describe the kinematic possibilities and the reconfiguration of the arm system. The joints are here just drawn as circles and no locking arrangements are shown. Kinematically the line 23 through the inner joints 10a and 11a, the line 62 through the outer joints 10b and 11b, the line 64 through the inner joints 13a and 14a, and the line 63 through the outer joints 13b and 14b should all be parallel to have a constant tilt angle of the actuated platform over the whole workspace. With these kinematic relations between the lines 23, 62, 63 and 64 the mounting of the link 12 is not critical, just it forms an angle in relation to the links 10 and 11 when the first arm 7 is projected on a plane parallel to the plan defined by the paths 1 and 2 (in the figure this plane is also parallel with the $x_w y_w$-plane).

As shown in FIG. 6 the joint 12b will collide with the path 1 when the arm system is manipulated in the right direction of the figure, but not when it is manipulated in the left direction. This gives a smaller workspace in the $y_w$-direction when the robot works in the right direction. To obtain the same $y_w$-width of the workspace in both directions, the links 11 and 12 in the first arm 7 can be mounted as in FIG. 12. Now both joints 11b and 12b have an offset relative the line 62, which passes through joint 10b and is parallel with the lines 23, 63 and 64. However, now the mounting of link 12 is critical to maintain a constant tilt angle of the actuated platform 16.

Figure 12:
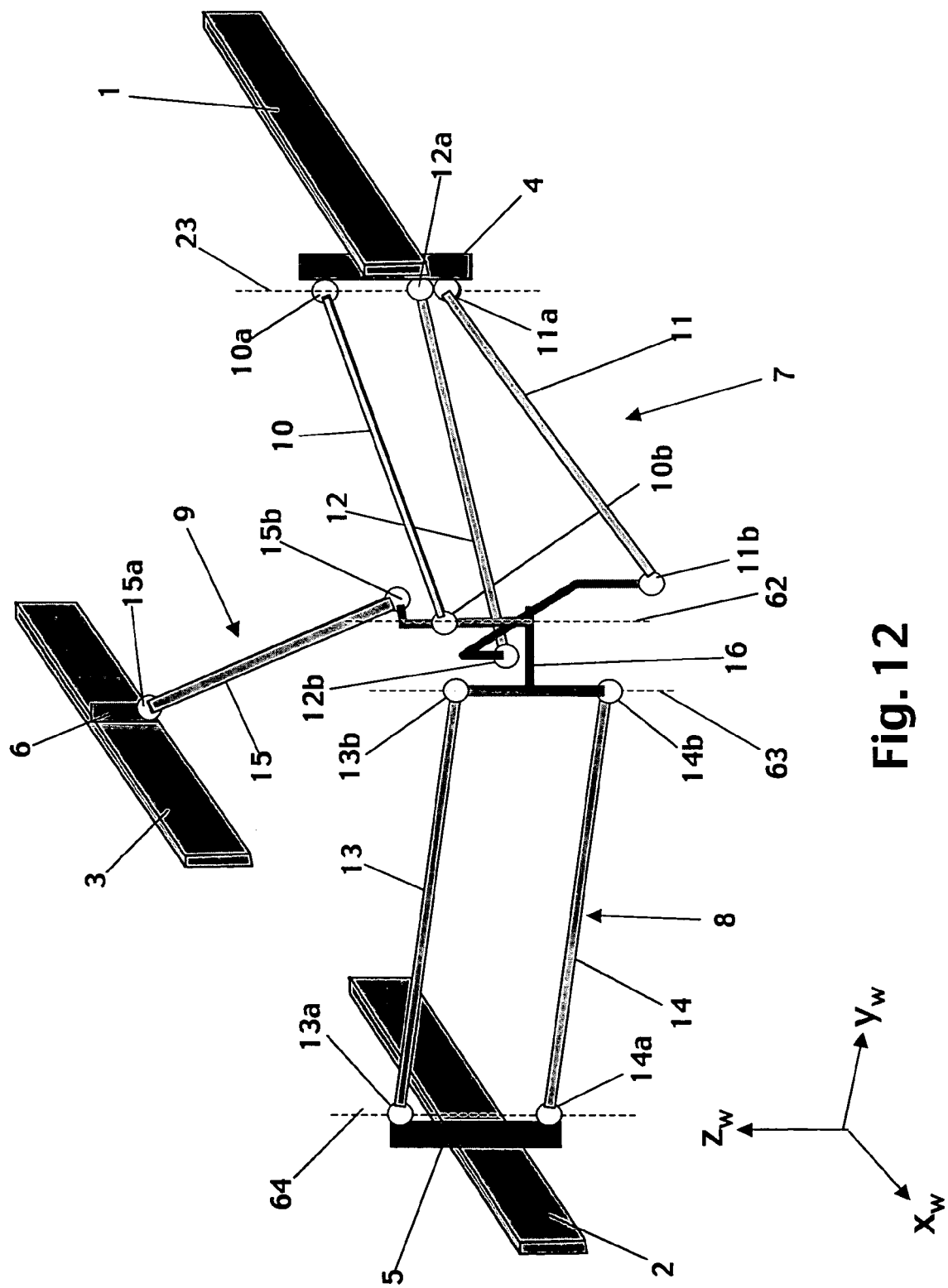
FIG. 12 shows a manipulator according to a third embodiment of the invention.
Figure 13:
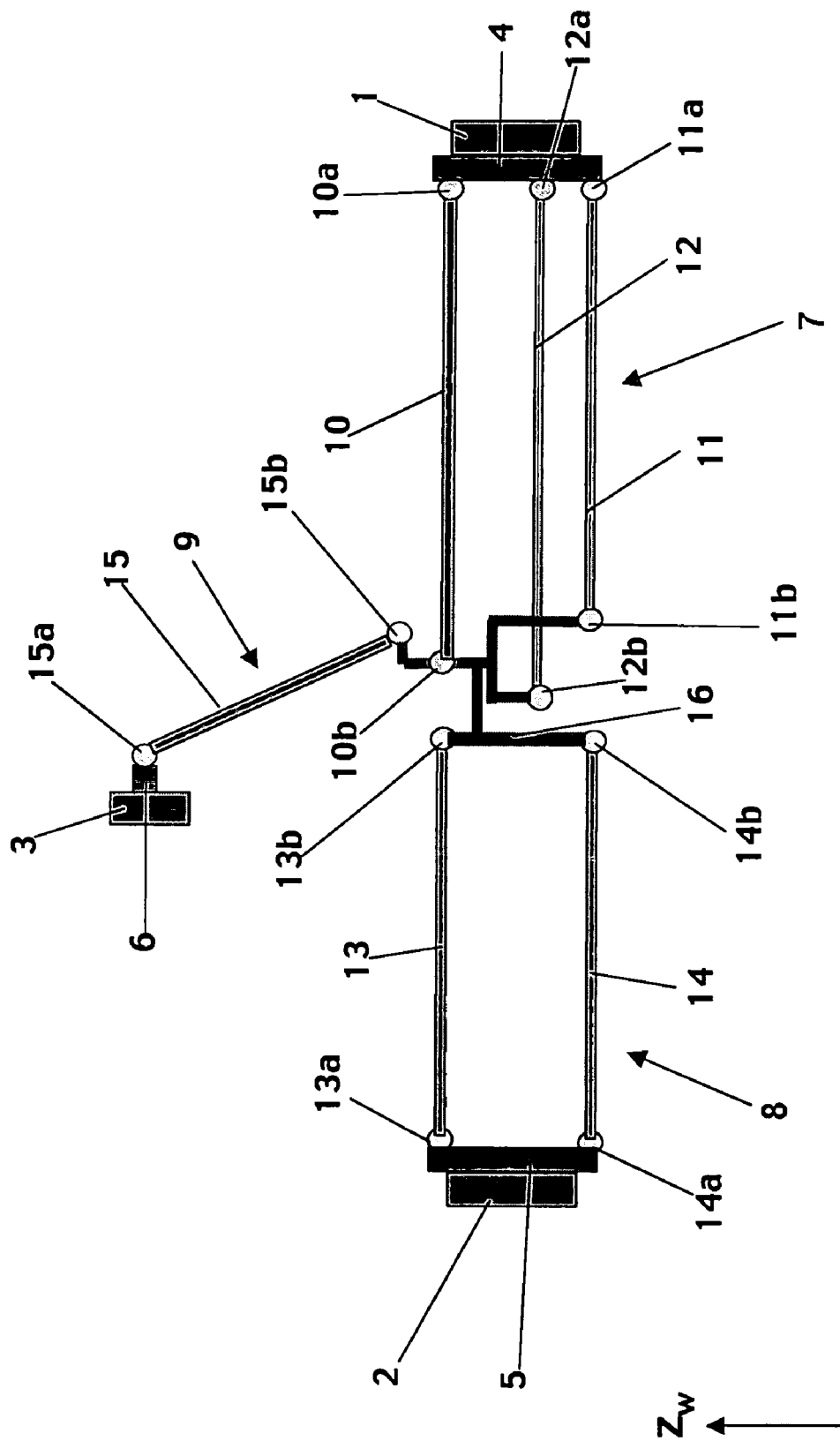
FIG. 13 shows a projection of the manipulator in FIG. 12 on the $y_w z_w$-plane.

The requirements on the mounting of the links 11 and 12 using the arm structure in FIG. 12 are defined in FIG. 13. FIG. 13 thus shows a projection of the manipulator in FIG. 12 on the $y_w z_w$-plane and then it is necessary that the projections of the links 10, 11 and 12 of the first arm 7 are all parallel as seen in the figure. In more general terms the projections of the links 10, 11 and 12 are made on a plane that is parallel to a line through the joints 13b and 14b. Another requirement for constant tilt angle of the actuated platform 16 is that the plane defined by the joints 10b, 11b and 12b should be in a common plane, which is parallel to the line through the joints 13b and 14b (the line 63 in FIG. 12).

Figure 14:
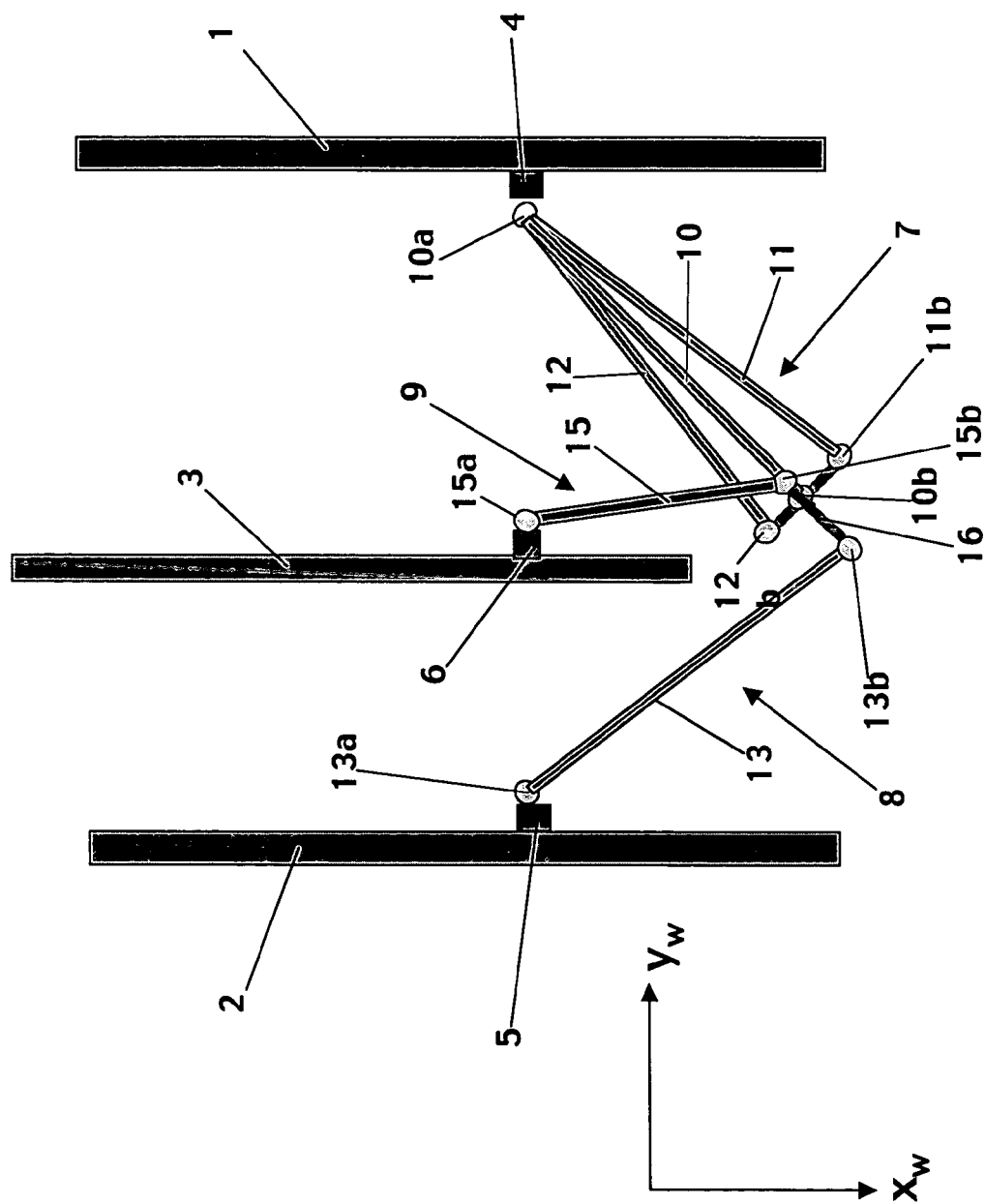
FIG. 14 shows a projection of manipulator in FIG. 12 on the $x_w y_w$-plane.

FIG. 14 shows a projection of the arm structure in FIG. 12 on the $x_w y_w$-plane and as can be seen both the links 11 and 12 form an angle relative the link 10 in this projection. Moreover, the joints 10b, 11b and 12b form a line in this projection. In more general terms this projection is made on a plane that is perpendicular to the line through the joints 13b and 14b (the line 63 in FIG. 12).

Figure 15:
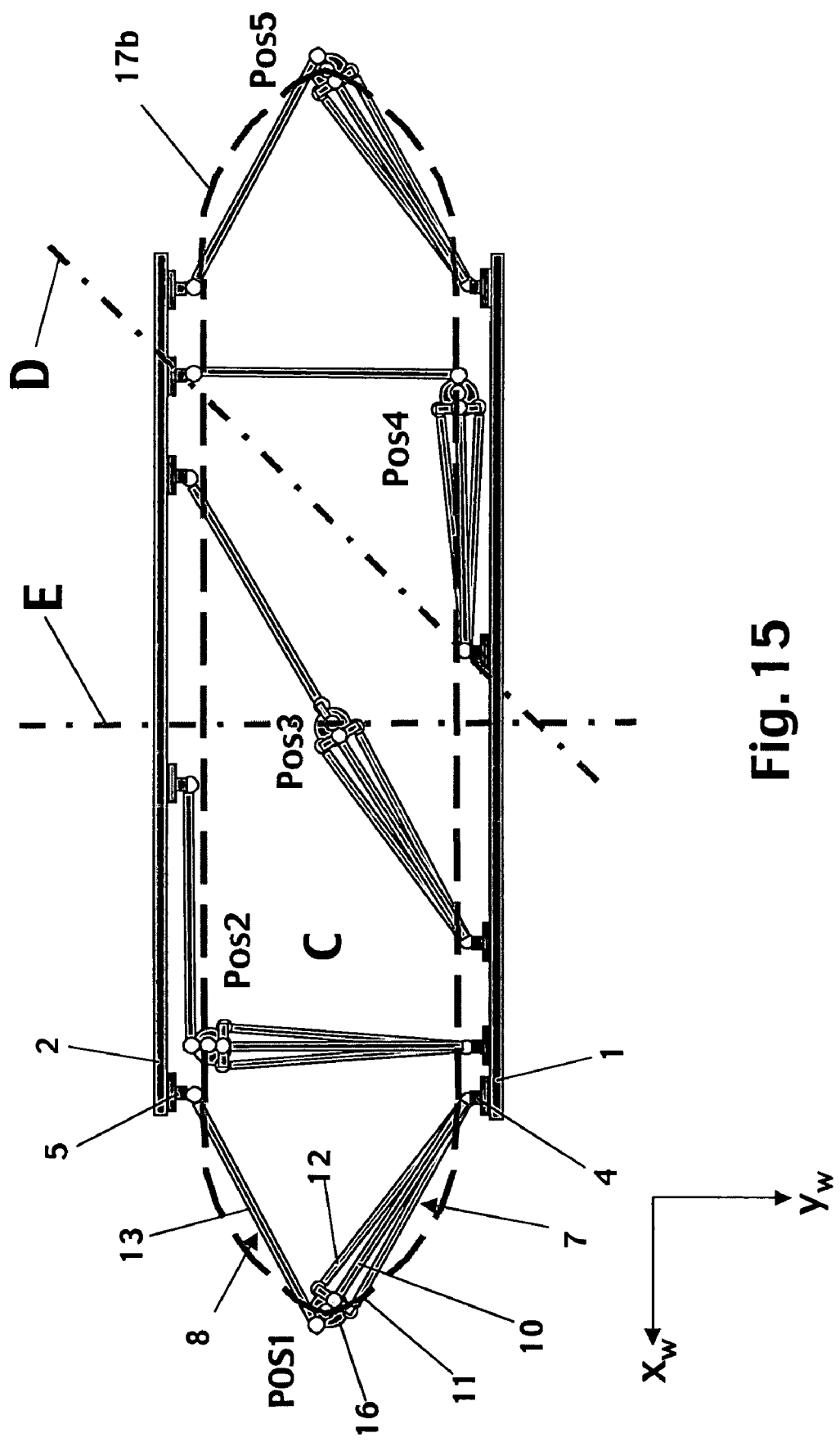
FIG. 15 shows a reconfiguration of the manipulator in the FIGS. 12-14.

FIG. 15 illustrates the reconfiguration as seen with a projection on the $x_w y_w$-plane. The different components projected on this plane are defined in the Pos1 of the actuated platform and can be compared with the components described for FIG. 14. The first path 1 and the second path 2 define a first plane C in the $x_w y_w$-plane. The first arm 8 is rotatable about the axis 23, which is perpendicular to the first plane C. The second arm 7 is rotatable about the axis 64, which is perpendicular to the first plane C. The first and second arm are arranged rotatable in such way that the platform 16 is movable between opposite sides of a second plane D, which is perpendicular to the first plane C and passes through the first and second carriage 4, 5. The second plane D continuously follows the carriages 4, 5. Thus, the direction of the plane D changes due to the positions of the carriages 4, 5. The first and second arm 7, 8 are arranged rotatable in such way that the platform 16 is movable between opposite sides of the second plane D. A third plane E is defined perpendicular to the first and second path 1, 2, and through the platform 16. The third plane E continuously follows the platform 16. Thus, the position of the third plane relative the paths 1, 2 changes due to the position of the platform.

In a first position, Pos 1, the arms 7 and 8 and the platform 16 are all to the left of the carriages 4 and 5. In the first position the first and second carriage are both positioned on the right side of the platform and thus on the right side of the third plane E. After actuating the first carriage 5 to the right along the path 2, the platform 16 will come above carriage 4 as shown in Pos2 and going further to the right with carriage 5 will put the platform 16 between the carriages 4 and 5. In a third position, Pos 3, the arms 7 and 8 have brought the structure to a singularity, and the following is recommended to perform to pass the singularity and proceed towards a fourth position, Pos4:

1) Move the robot to a position close to the singular position. Change the control mode of the actuation of one of the carriages 4 and 5 to compliant control, meaning that the carriage in question will move as controlled by a spring and a damper when subjected to an external force. When the compliant control mode is activated the arm system will sag somewhat, and to avoid this, for example the brake 54, 55 in FIG. 10, or the locking mechanism 27, 38 in FIG. 8*d* can be activated. This may be necessary if instead of using compliant control a deactivation of the control is made.

2) Lock one of the links from rotating about its longitudinal axes, for example with the brake 48, 49 in FIG. 10, if this concept is used. If the concept with a special bearing arrangement according to FIG. 9 is used, the locking of one degree of freedom will be made automatically.

3) Run carriage 6 of the third arm, not shown in the figure, see instead FIG. 13, to move the first and second arm 7 and 8 through the singularity at Pos3.

4) Releasing the locking of one of the links from rotating about its longitudinal axes. Release the brake 48,49 if this concept is used. If the concept with a special bearing arrangement according to FIG. 9 is used, the locking of one degree of freedom will be released automatically.

5) Restart ordinary position control of the carriage, for which the control mode was changed in 1 above.

6) Release the brake 54, 55 in FIG. 10 or the locking mechanism 27,38 in FIG. 8*d* if these were locked according to 1) to avoid the arm system to sag when the compliant control was used for one of the carriages 4 and 5.

Now the carriage 6 is on the wrong side of the platform 16 and therefore it is necessary to move the carriage 6 over to the other side. Then, however, the platform 16 will be manipulated deep down and if there is an object in the workspace a collision may take place. To avoid this the link 15 of the third arm is allowed to move in relation to its inner joint in a direction along the longitudinal axes of the link.

7) Locking one of the links of the first or second arm from moving in a direction perpendicular to a plane passing the first and second paths, for example by activating the brake 54, 55 in FIG. 10, or the locking mechanism 27, 38 in FIG. 8*d*.

8) Allowing the link 15 to move in relation to its inner joint 15*a*, for example by releasing the locking unit 24, 25 in FIG. 8*a*.

9) Moving the carriage 6 over to the other side of the actuated platform 16.

10) Locking the locking unit 24, 25 in FIG. 8*a*. This should be made in an exact position of the carriage 6 or the actuation of carriage 6 is switched to compliant control and the locking mechanism locks the link 15 in a precision clamping position.

11) Releasing the locking of one of the links of the first or second arm from moving in a direction perpendicular to a plane passing the first and second paths, by releasing the brake 54,55 in FIG. 10 or the locking mechanism 27,38 in FIG. 8*d*.

12) Moving the first and second carriage 4, 5 relative each other until the robot reaches a fifth position, pos 5 in which the first and second carriage both are positioned on the left side of the third plane E passing through the platform.

The activities 1-12 above can be controlled to be very fast but the precision and stiffness of the manipulator will not be maintained during the passing of the singularity in Pos 3. FIG. 15 also shows the arms 7 and 8 for the platform positions Pos4 and Pos5 and as can be seen the platform can move both between the paths 1 and 2 and outside at the ends of the paths. This means that this manipulator will have a larger workspace in relation to the size of the manipulator than a conventional gantry robot with serial kinematics. The workspace is shown by the broken line 17*b*.

Figure 16:
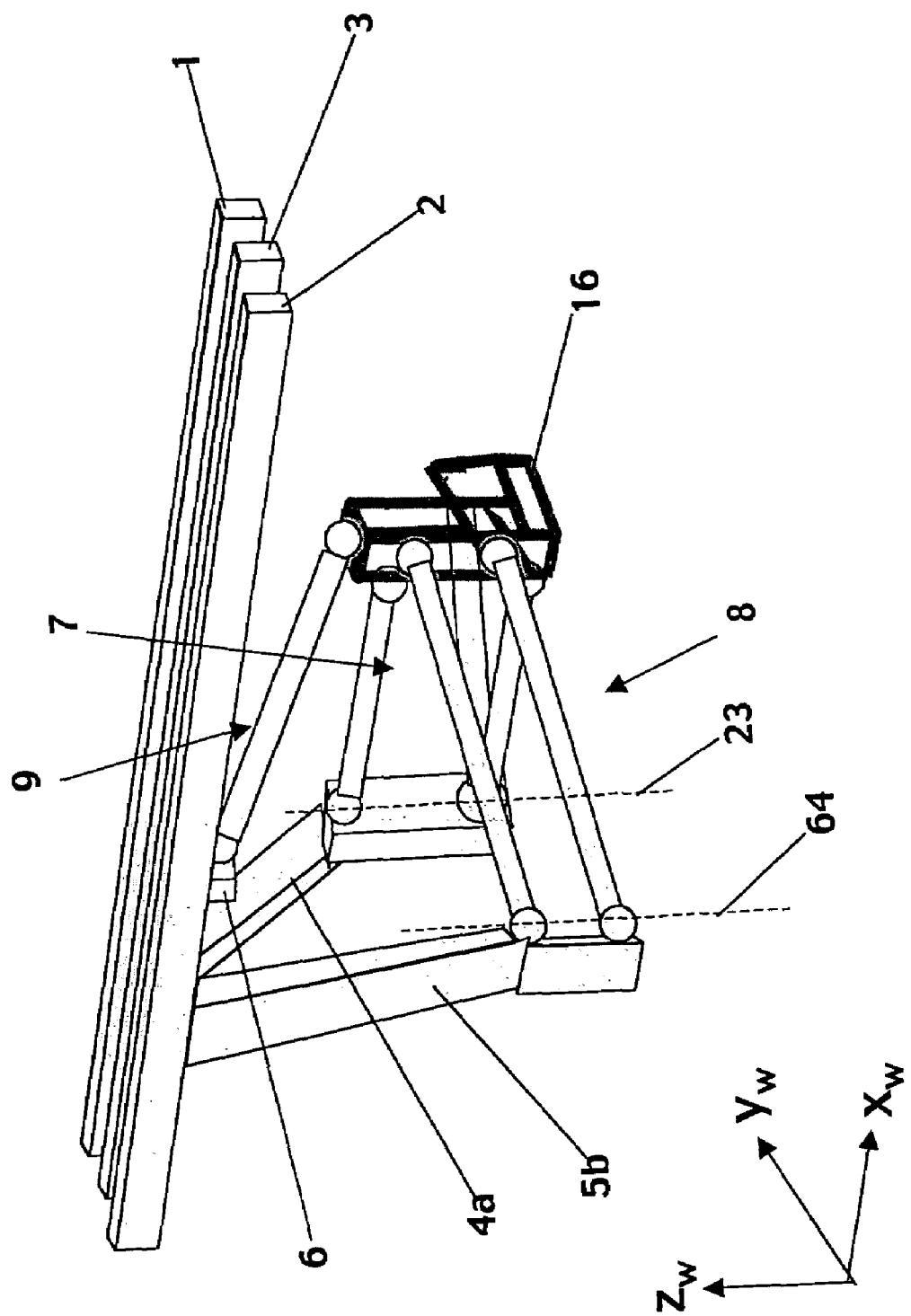
FIG. 16 shows a manipulator according to a fourth embodiment of the invention.

One way to get rid of the collision problem shown in FIG. 6 and which was solved to some extent with the platform design of FIG. 13, is to use arms on the carriages as seen in FIG. 16. In the figure the carriages 4 and 5 have got arms 4*a* and 4*a*, while the carriage 6 does not need any arm. Simultaneously, the paths 1, 2 and 3 have been mounted close to each other. Now there are no paths 1 and 2 that will collide with the platform 16, and the arms 7 and 8 can swing far out in the plus and minus $y_w$-directions. With the carriage arms 4*a* and 5*a* it will also be possible to reconfigure the manipulator even if the lengths of the carriages arms 4*a* and 5*a* are longer than the shortest distance between the lines 23 and 64. This manipulator design is not as stiff as the manipulators shown up to now. This depends on the fact that the carriage arms 4*a* and 5*a* will bend in response to the forces from the arms 7 and 8. This bending will also give stiffness problems for the linear bearings between the carriages 4 and 5 and the paths these are mounted on.

Figure 17:
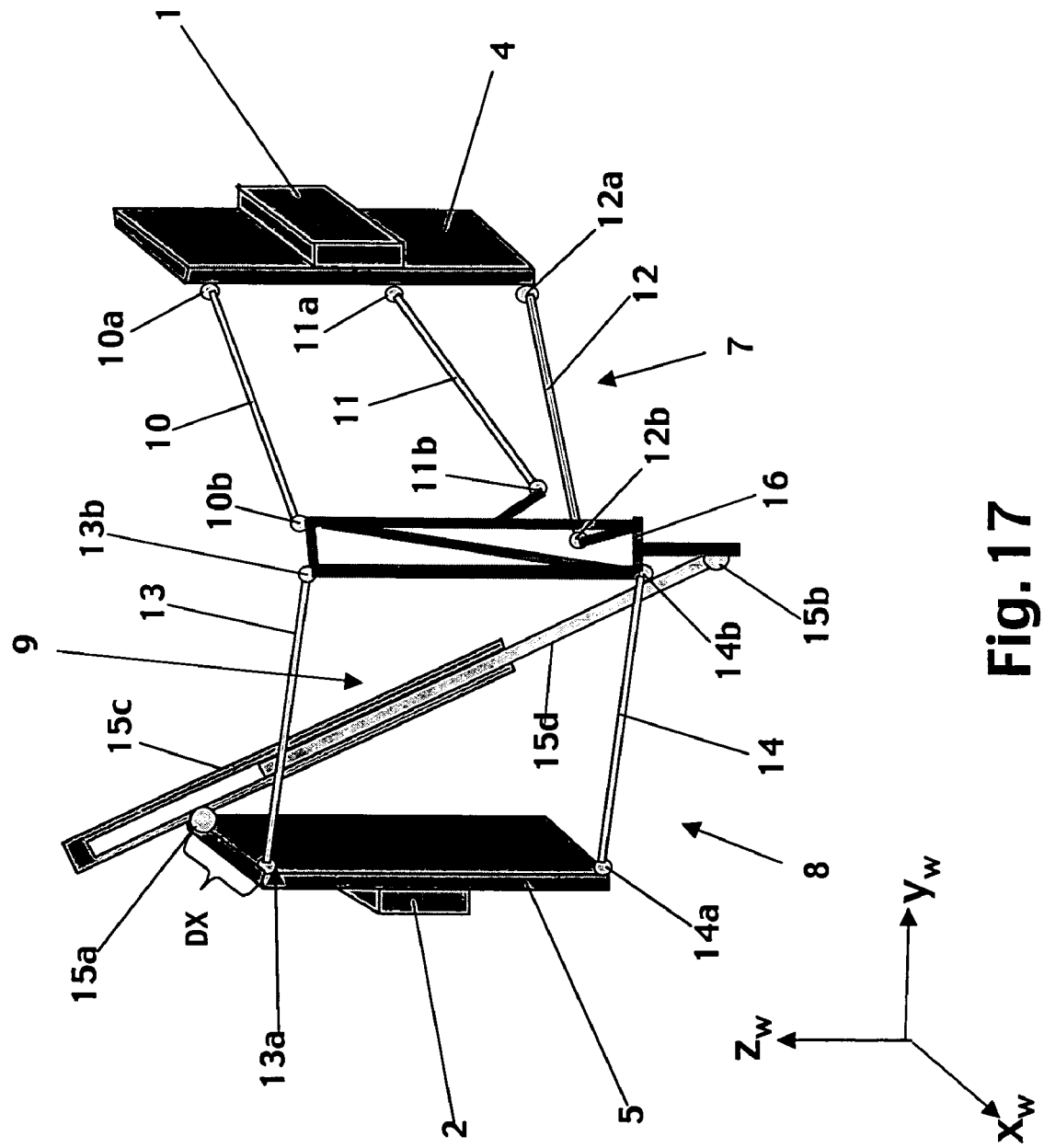
FIG. 17 shows a manipulator according to a fifth embodiment of the invention.

Up to now the link 15 has been manipulated by a carriage 6 on a path 3 parallel to the paths 1 and 2, and to reconfigure the link 15 a linear bearing 26 and a locking mechanism 24, 25 were introduced. To get rid of this arrangement a solution according to FIG. 17 can be used. Here a linear actuator is integrated into the link 15. Thus, link 15 includes one part 15*c* mounted on the carriage 5 with the joint 15*a* and a second part 15*d* mounted on the actuated platform with the joint 15*b*. The parts 15*c* and 15*d* are actuated to move relative each other to control the distance between the joints 15*a* and 15*b*. To be able to make a reconfiguration of the arms 7 and 8 a distance DX in the $x_w$-direction is needed between the joints 15*a* and 13*a*.

Figure 18:
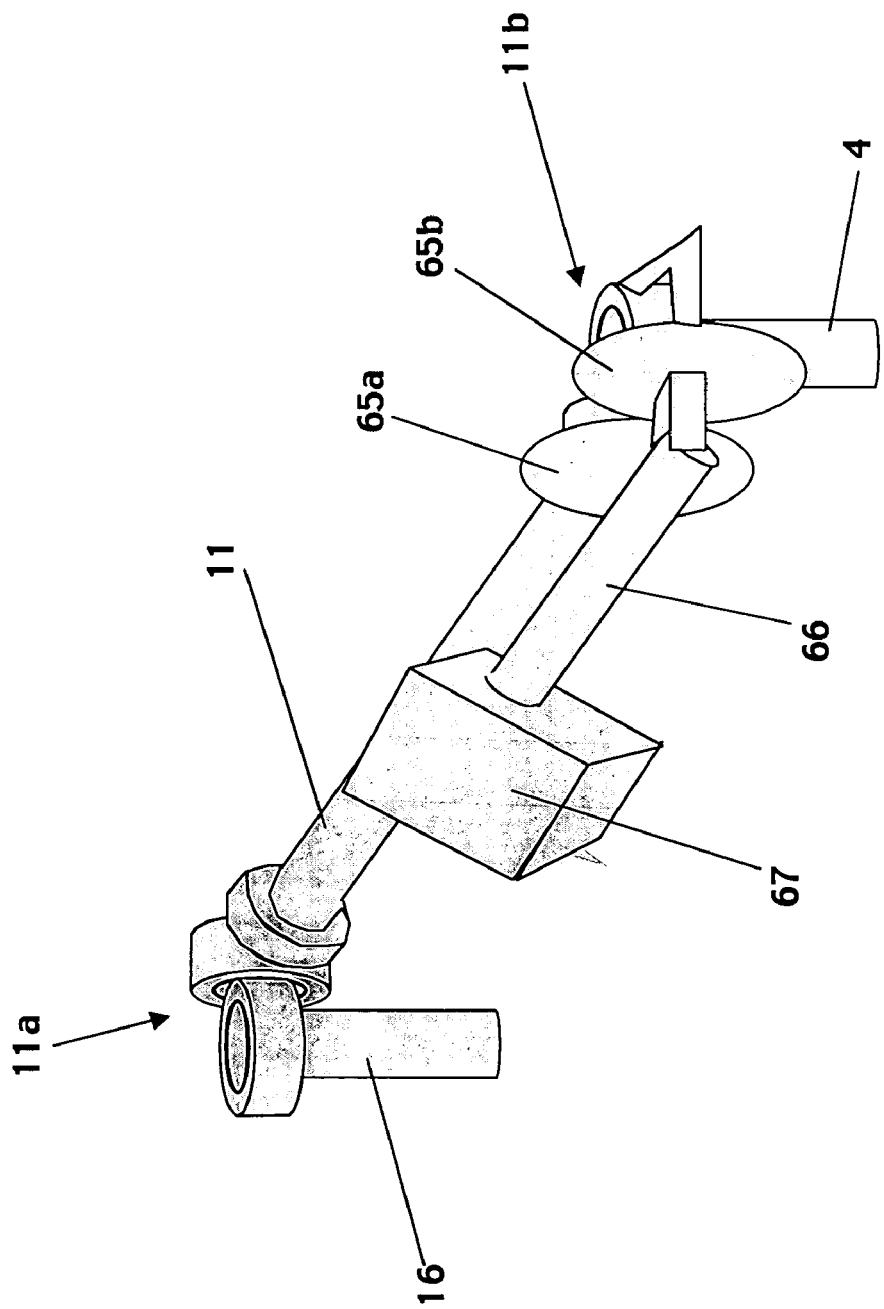
FIG. 18 shows a special arrangement for avoid collisions between a counter balancing weight and the paths.

In order to be able to perform reconfiguration and simultaneously have a balancing of the arm system, a special arrangement is needed to avoid collisions between a counter balancing weight and the paths. Thus, FIG. 18 shows how a balancing weight 67 on the lever 66 is connected to the link 11 via a one-stage gear box with gears 65*a* and 65*b*. With this arrangement the weight 67 will move upwards when the platform 16 moves downwards and vice versa. Of course spring mechanisms can also be used for the balancing, but it is difficult to obtain the same compensation accuracy with a spring-based counter balancing system.

Figure 19:
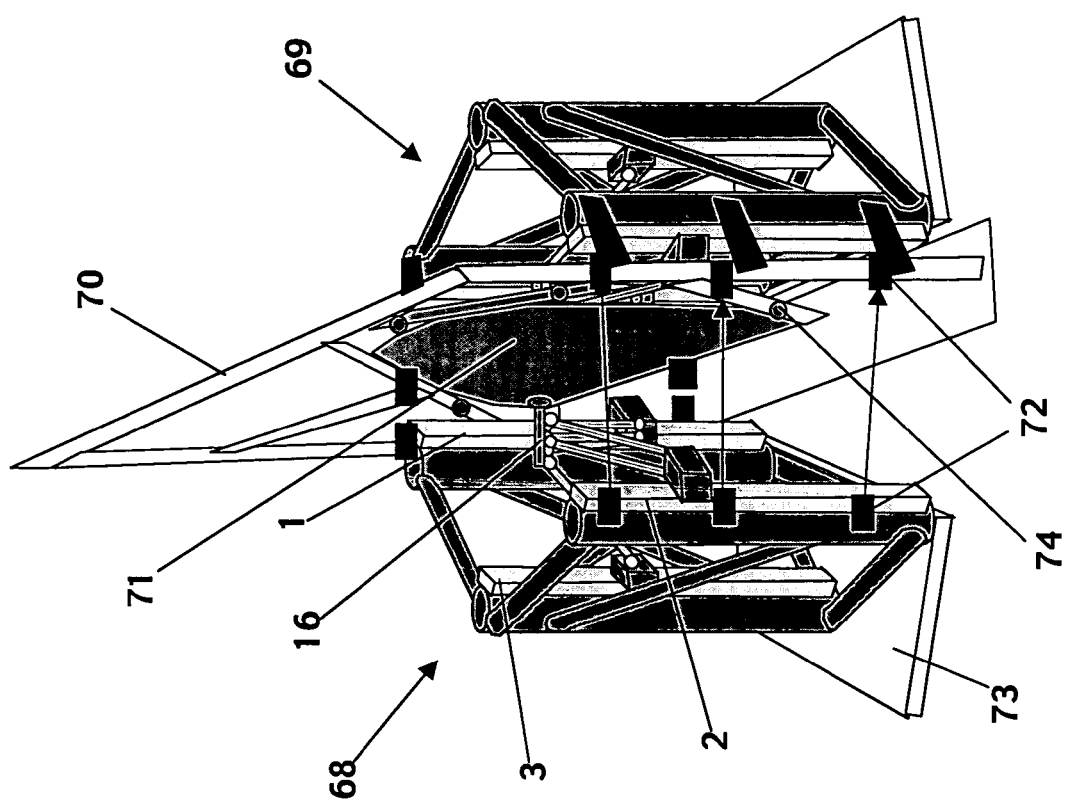
FIG. 19 shows one example of a suitable application for a manipulator according to the invention.

There are many applications for the parallel kinematic manipulator with reconfiguration functionality described in this patent application. Examples are grinding, drilling, polishing, milling, deflashing, deburring, material handling, assembly, disassembly, laser cutting, measurements and machine tending. FIG. 19 shows one example of a potential application. Here the paths 1, 2 and 3 are vertical and the manipulators 68 and 69 include triangular support structures mounted on bases 73, which are movable with air bearings or wheels. In this application the support structures are clamped to the object fixture 70 by means of clamping mechanisms 72. After clamping, the actuated platform 16 can be moved to calibration points 74 on the fixture or on the object 71 itself to calibrate the manipulator to the fixture and the object. In the figure two manipulators, 68 and 69 work opposite to each other on each side of the object 71. For example the manipulator 69 drills in an airplane flaps, while the manipulator 68 has a tool to counteract the forces caused by the drilling process. The arm system of the robots can for example at first drill holes when it is in a configuration where the actuated platform works upwards and then drill holes when the platform works downwards after a reconfiguration. Some of the advantages with using this type of manipulator are: lightweight, low cost, high stiffness, especially with the clamping mechanisms 72, easy to move around use it where it is needed, safe since the workspace is inside the support structure for the paths, high accuracy, and can be very fast because of low moving mass.

The robot according to the invention includes a control unit having a memory, one or more processors and other equipment necessary for controlling the motion of the robot. The control unit includes software for carrying out all the steps previously mentioned for performing the reconfiguration of the robot, i.e. to move the platform and the links of the first and second arm between opposite sides of the second plane passing through the first and second carriage 4, 5.

Figure 20:
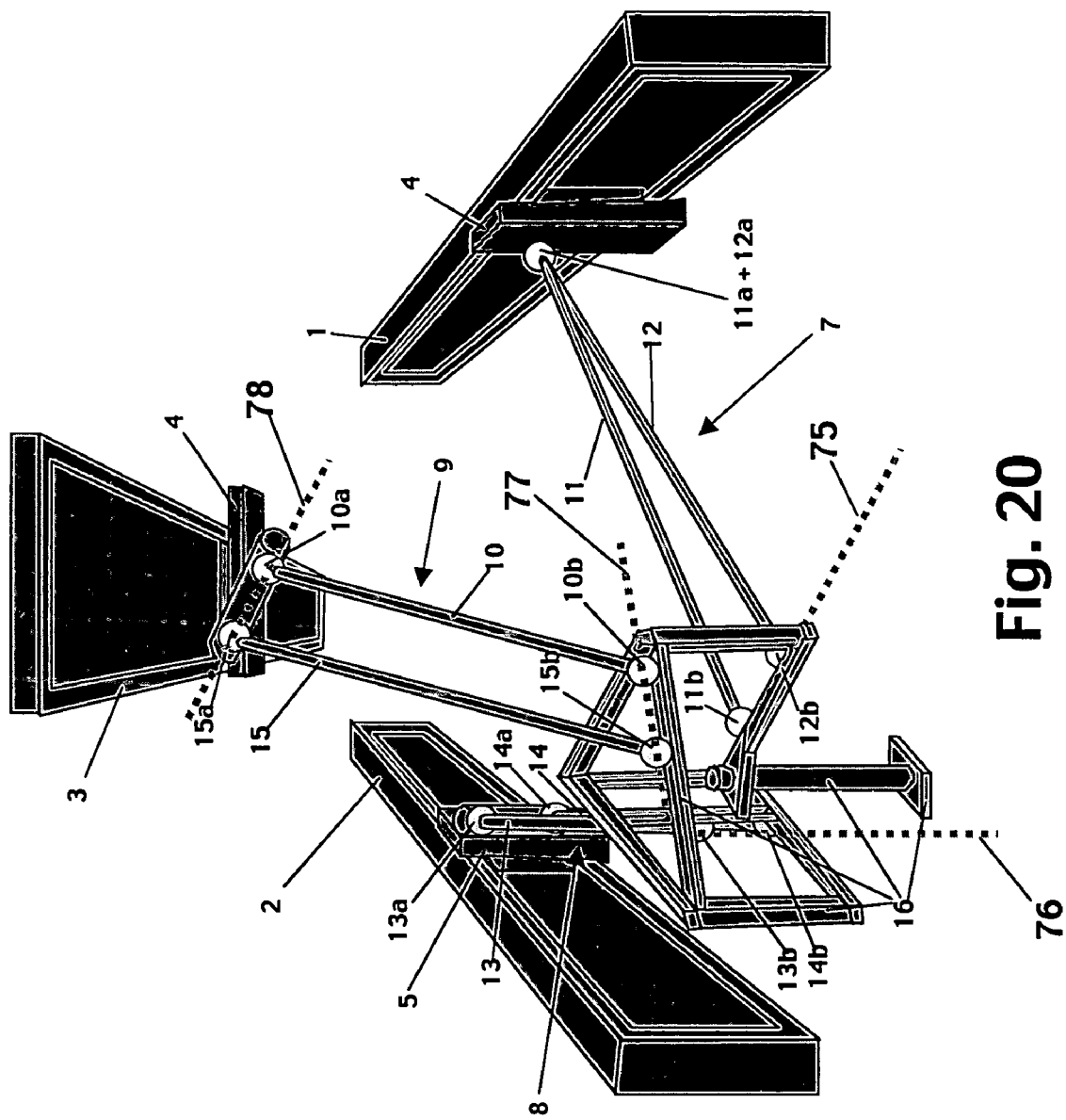
FIG. 20 shows a manipulator according to a sixth embodiment of the invention.

FIG. 20 shows alternative link structures of arms 7 and 9, which also make reconfiguration of the robot possible. The link 10 has here been moved from arm 7 to arm 9 and is parallel with link 15 and has the same length as link 15. It should be observed that in order to constrain all the 6 DOF of the platform with only axial forces in the six links, there are restrictions on the mounting of the joints on the platform framework 16. A line 75 is defined as passing the kinematic centers of the joints 11b and 12b, a line 76 passes the centers of the joints 13b and 14b, a line 77 passes the centers of the joints 10b and 15b, and finally a line 78 passes the centers of the joints 10a and 15a. Lines 77 and 78 are parallel even if the figure does not show this properly. The constraints on the mounting of the links on the platform are: Line 75 and 76 are not allowed to be parallel and the most rigid mounting (as far as possible from a singularity) is achieved when the lines 77 and 78 are orthogonal to each other. Furthermore the line 77 must not be parallel to any of the lines 75 and 76. The most rigid mounting is obtained when the line 77 has 45 degrees in relation to the line 75 and 90 degrees in relation to line 76 as shown in the figure.

FIGS. 21a, 21b, and 21c different alternatives for decreasing the average actuator force needed to compensate for the gravity-induced forces on the carriers on the linear paths. In FIG. 21a the first bearing 103 of the inner joint is mounted on the carrier and on the axis that comes out from this bearing a lever with a weight is mounted to counter balance the torque on this axis coming from the link mounted on the second bearing of the inner joint. In FIG. 21b the counter balance is obtained by springs and in FIG. 21c with a pneumatic or hydraulic actuator instead. The reference numbers in the figure are:

100: A counter balance weight connected to the first axis of a 2 DOF joint.
101: A second bearing of the inner joint.
102: Link to platform
103: First bearing of inner joint, responsible for swinging of the link in the vertical plane
105: Springs connected to first axis of a 2DOF joint for counter balancing.
106: Active actuation connected to first axis of a 2DOF joint for counter balancing, pneumatic or hydraulic.

In the following a number of different embodiments of a parallel kinematic robot is discussed.

FIGS. 22a and 22b show how a single link can be assembled using pairs of ball and socket joints. FIG. 22a shows 2 types of spring mounted ball and socket pairs, one with the spring direction perpendicular to the link and one with the spring direction parallel with the link. In FIG. 22b it is shown how a counter balance can be mounted on one of the ball and socket joints. Instead of a weight for counter balance, springs, pneumatics or hydraulics can be used; compare FIGS. 21b and 21c.

The reference numbers in the figure are:
110: Single link with double ball and socket joints to obtain single joint kinematics.
111: A ball
112: A socket
113: A spring
114: 1 DOF bearings
115: A single link
116: 1 DOF bearing with rotation axis. Concentric with the link axis.
117: A counter weight connected to ball and socket.

Figure 23B:
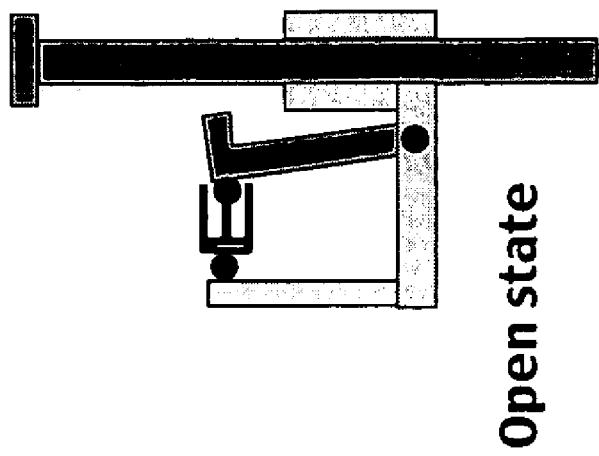
Figure 23A:
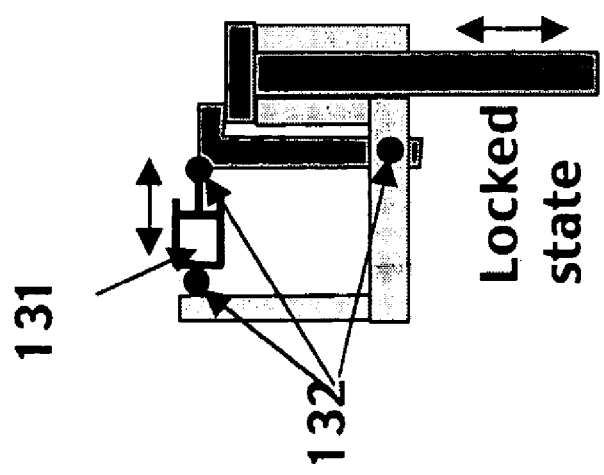

FIGS. 23 and 23b exemplify a locking mechanism for link 15 to be used when reconfiguring arm 9. Link 15 has a disc on its end, which is clamped by an angled arm. By tilting the angled arm with a linear positioner (electric, hydraulic or pneumatic) the link 15 can be released. The reference numbers in the figure are:

131: A positioner, for example a magnetic positioner
132: 1 DOF bearings

Figure 24:
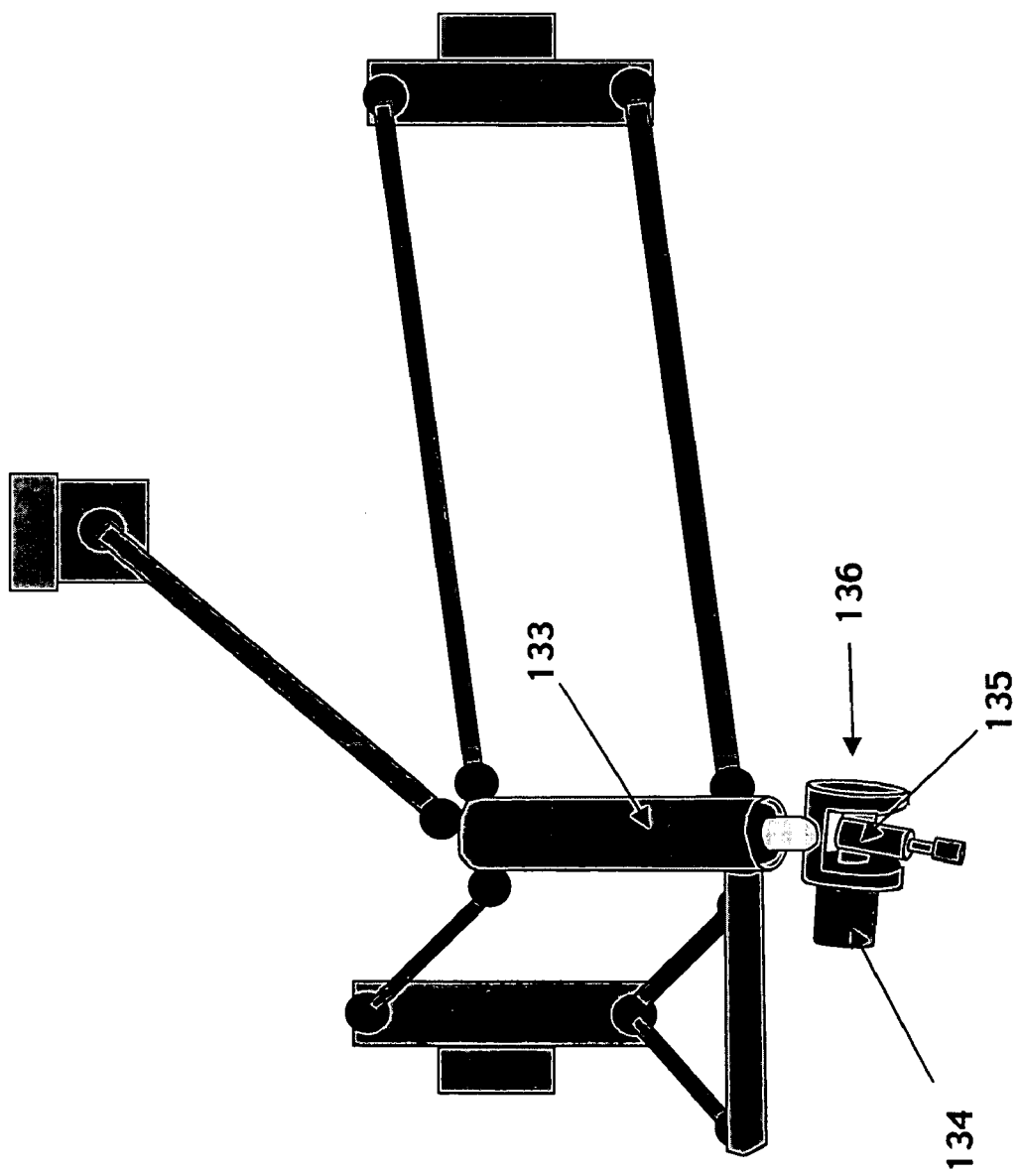

FIG. 24 shows how a 2 DOF wrist can be integrated into the platform of the parallel kinematic manipulator.

Figure 25:
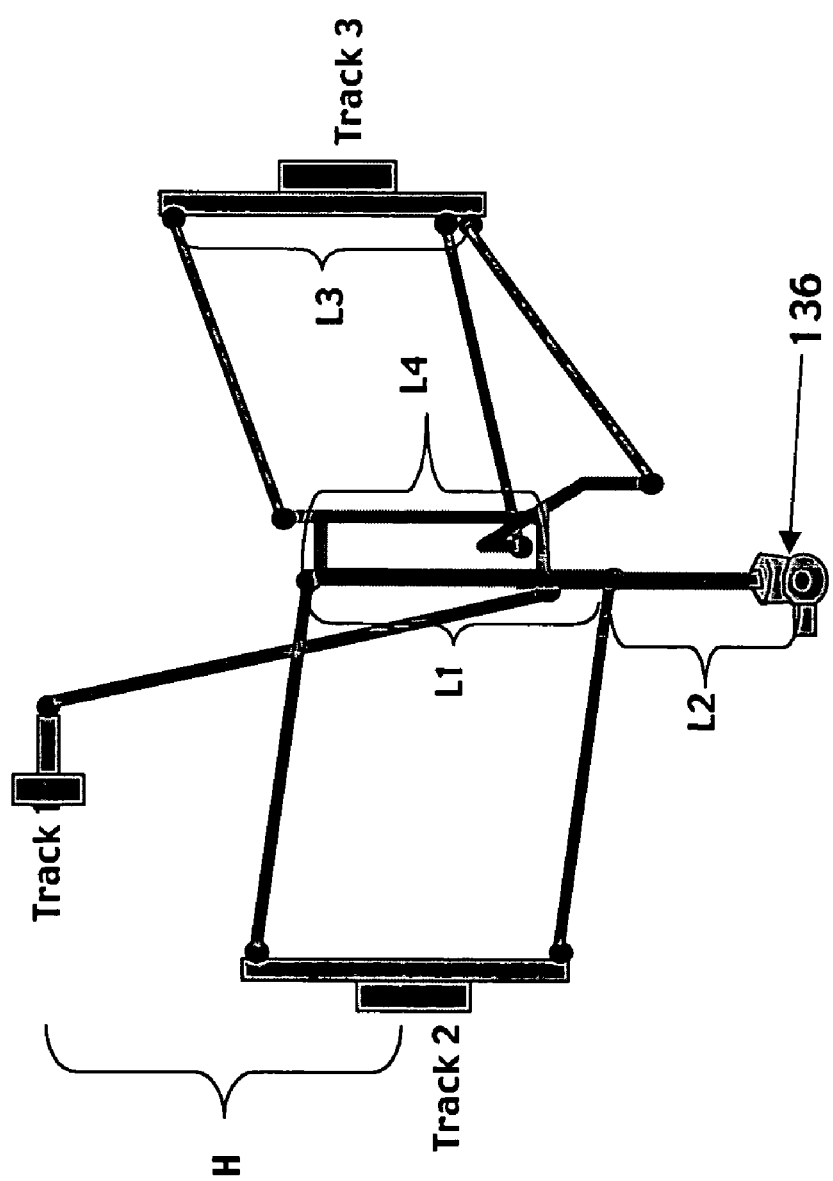

The reference numbers in the figure are:
133: Motor and gear box for rotation of the wrist inside the platform tube.
134: Motor and gear box for tilting
135: A tool
136: 2 DOF wrist mounted on the platform FIG. 25 stresses some important kinematic lengths that must be taken into account when the stiffness of the manipulator is optimized. The reference number in the figure is:
136: 2 DOF wrist mounted on the platform.

Figure 26:
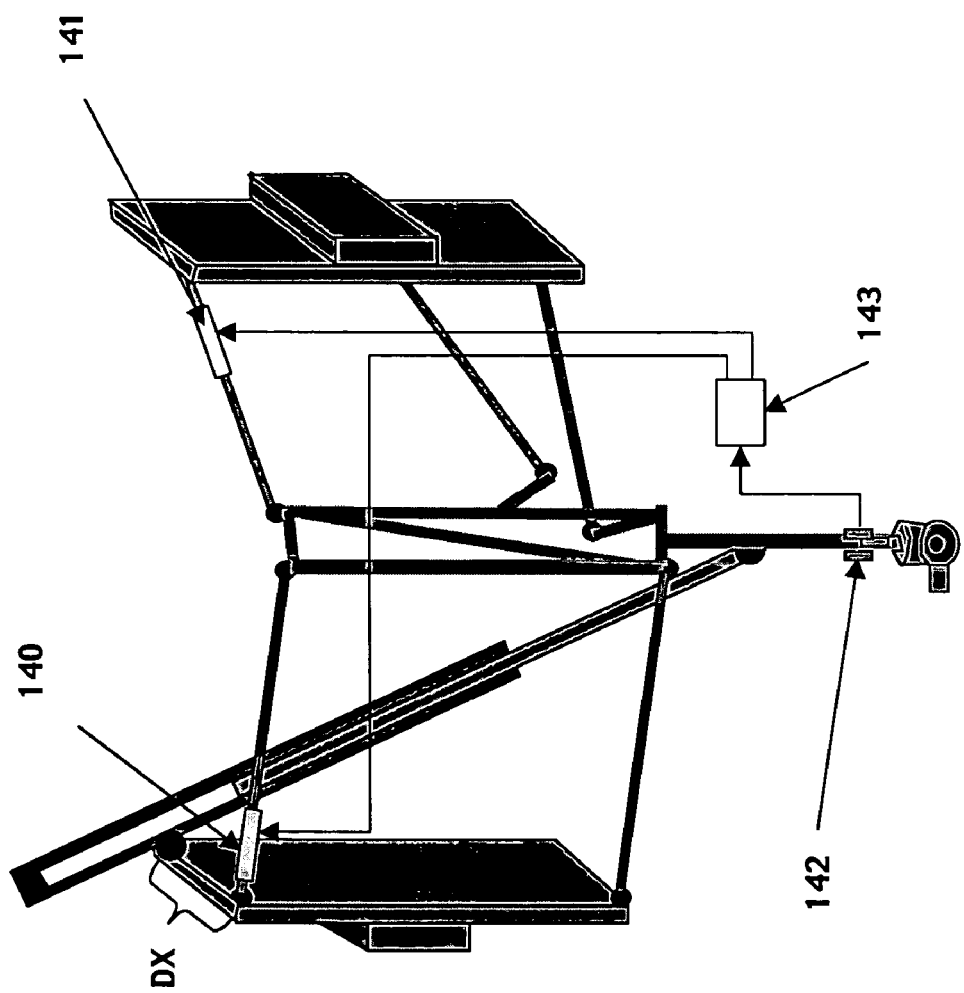

FIG. 26 show how so called adaptronics can be used to compensate for the compliance in platform, joints and links. A tool force on the wrist will give rise to torques and forces in the platform, which are measured with the force/torque sensor. The sensor signals are used by a controller to change the lengths of links using for example a piezoelectric actuator. The control makes use of a stiffness model a kinematic error model of the manipulator structure and controls the actuators A1 and A2 in such a way that the tool will be kept in position also when the manipulator components are deformed by the tool forces.

The reference numbers in the figure are:

140: An actuator A2, for example a piezoelectric or magnetostrictive device.

141: An actuator A3, for example a piezoelectric or magnetostrictive device.

142: A force and torque sensor

143: A stiffness controller, which controls the actuators A1 and A2 to compensate for compliance in the platform and the links.

Figure 27:
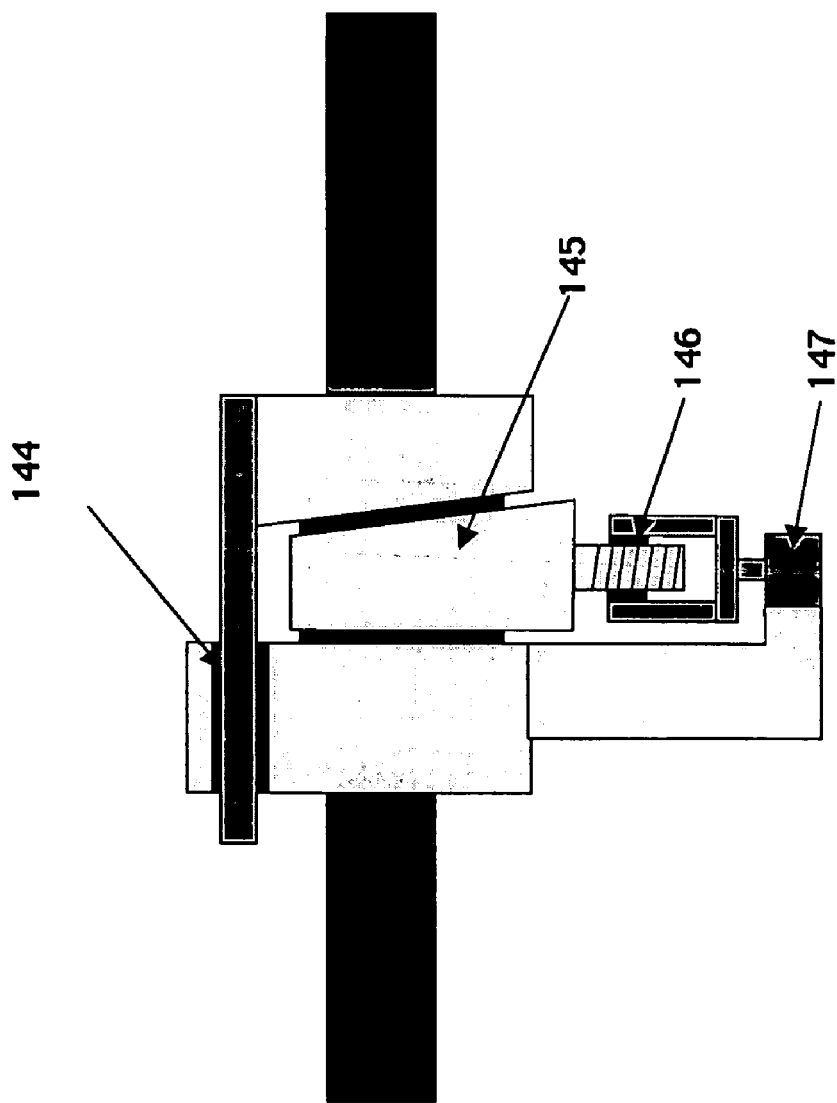

FIG. 27 shows a mechanical implementation of the actuators A1 and A2 in FIG. 26. The distance between the inner and outer joint of the link is controlled by moving a wedge in and out between two link segments.

The reference numbers in the figure are:

144: A linear bearing to keep the struts parts in relative position to each other (in total two are needed if cylindrical).

145: A wedge with linear bearings on both sides.

146: A ball screw

147: A motor with a gearbox

Figure 28:
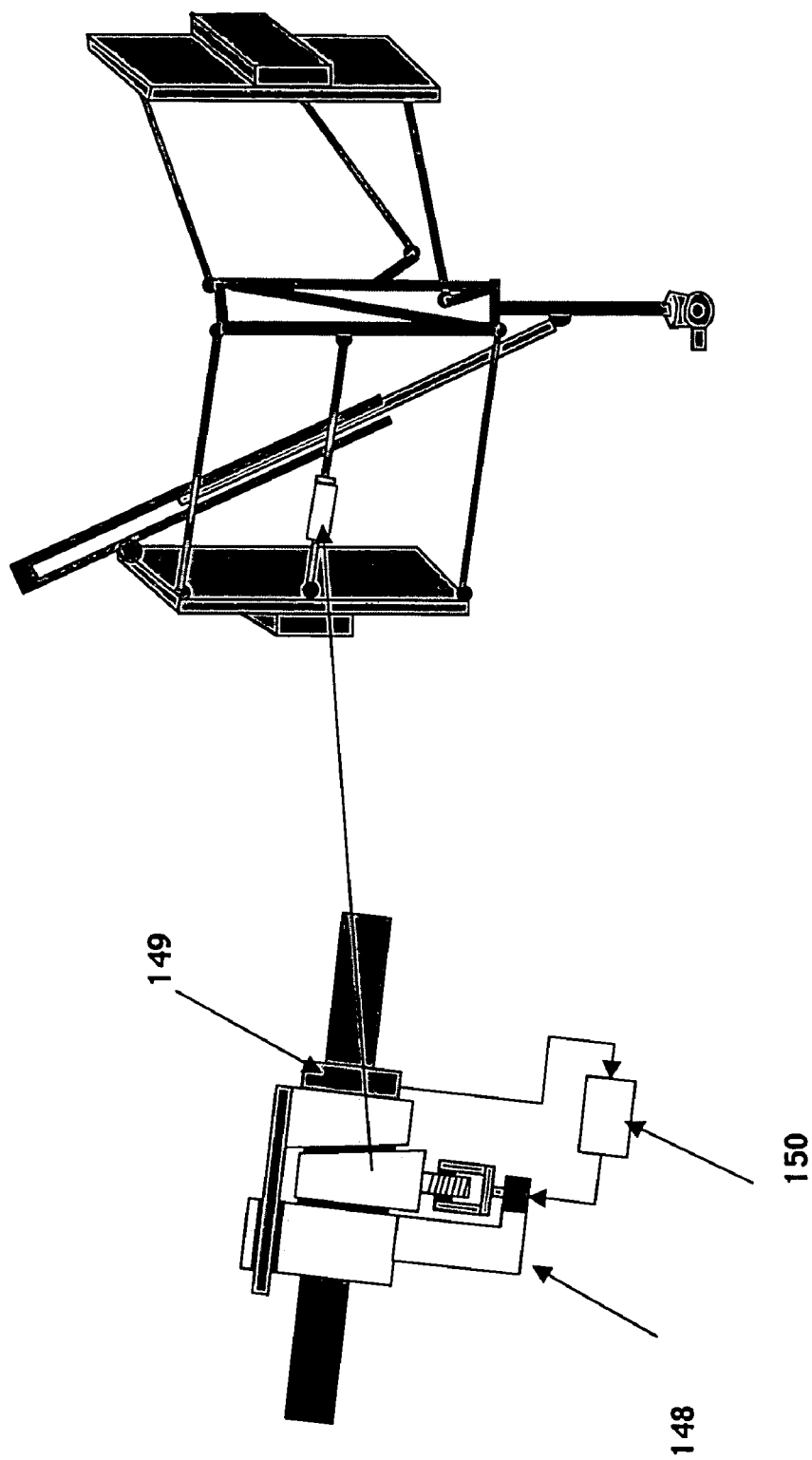

FIG. 28 shows how the actuator in FIG. 27 is mounted in a redundant link to give a pre stress of the robot structure, which will increase the stiffness of the joints.

The reference numbers in the figure are:

148: An actuator as in FIG. 27.

149: A force sensor

150: A controller to compensate for the compliance of the links.

Figure 29:
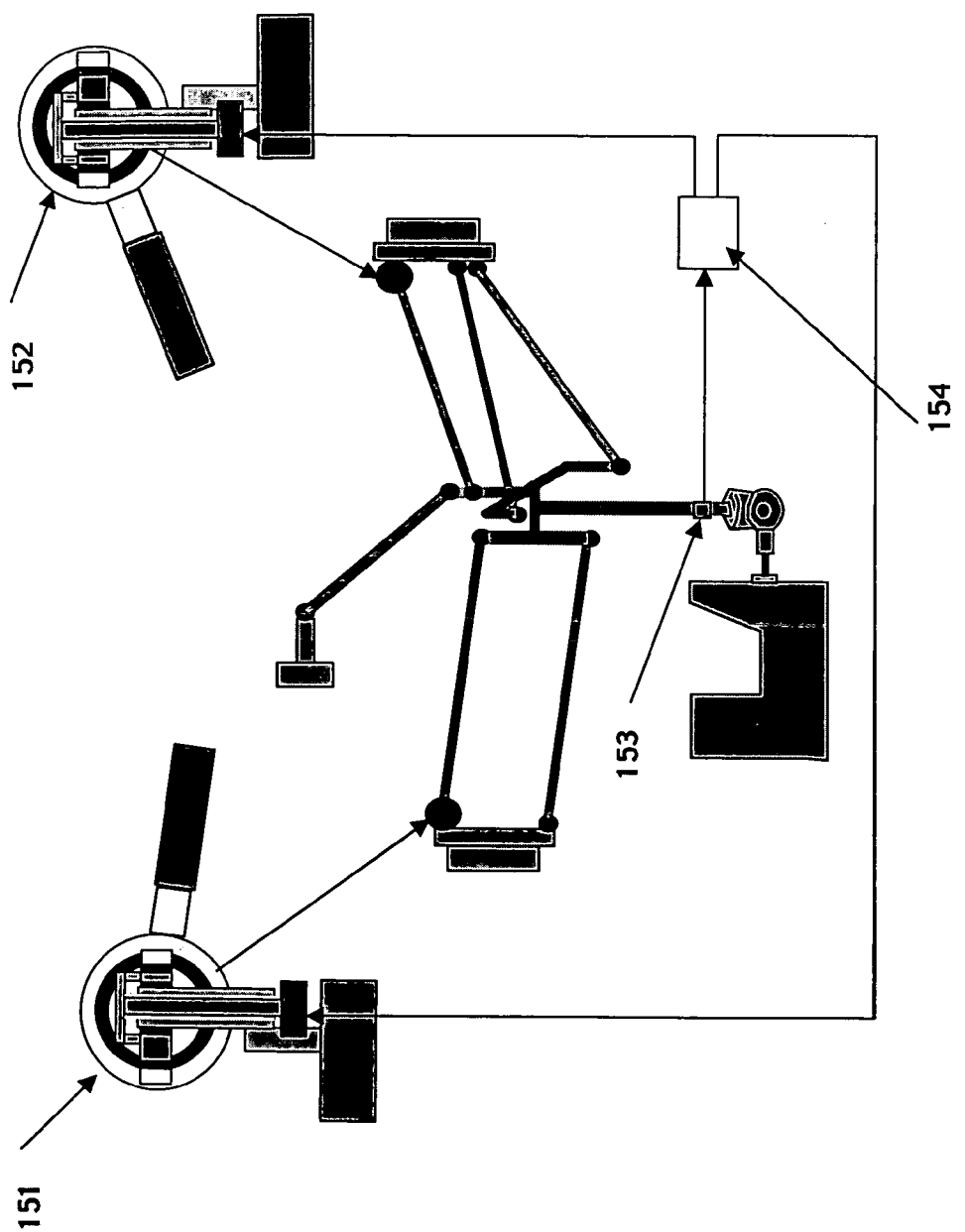

FIG. 29 shows an alternative arrangement to control the kinematic distance between the inner and outer joint of a link. Here the kinematic centre of the joint is modulated by means of a motor, as described more in detail in FIGS. 30 and 31.

The reference numbers in the figure are:

151: An actuator A2, implemented as a motor controlled joint centre manipulator.

152: An actuator A1, implemented as a motor controlled joint centre manipulator.

153: A force and torque sensor

154: A stiffness controller, which controls the actuators A1 and A2 to compensate for compliance in the platform and the links.

Figure 30:
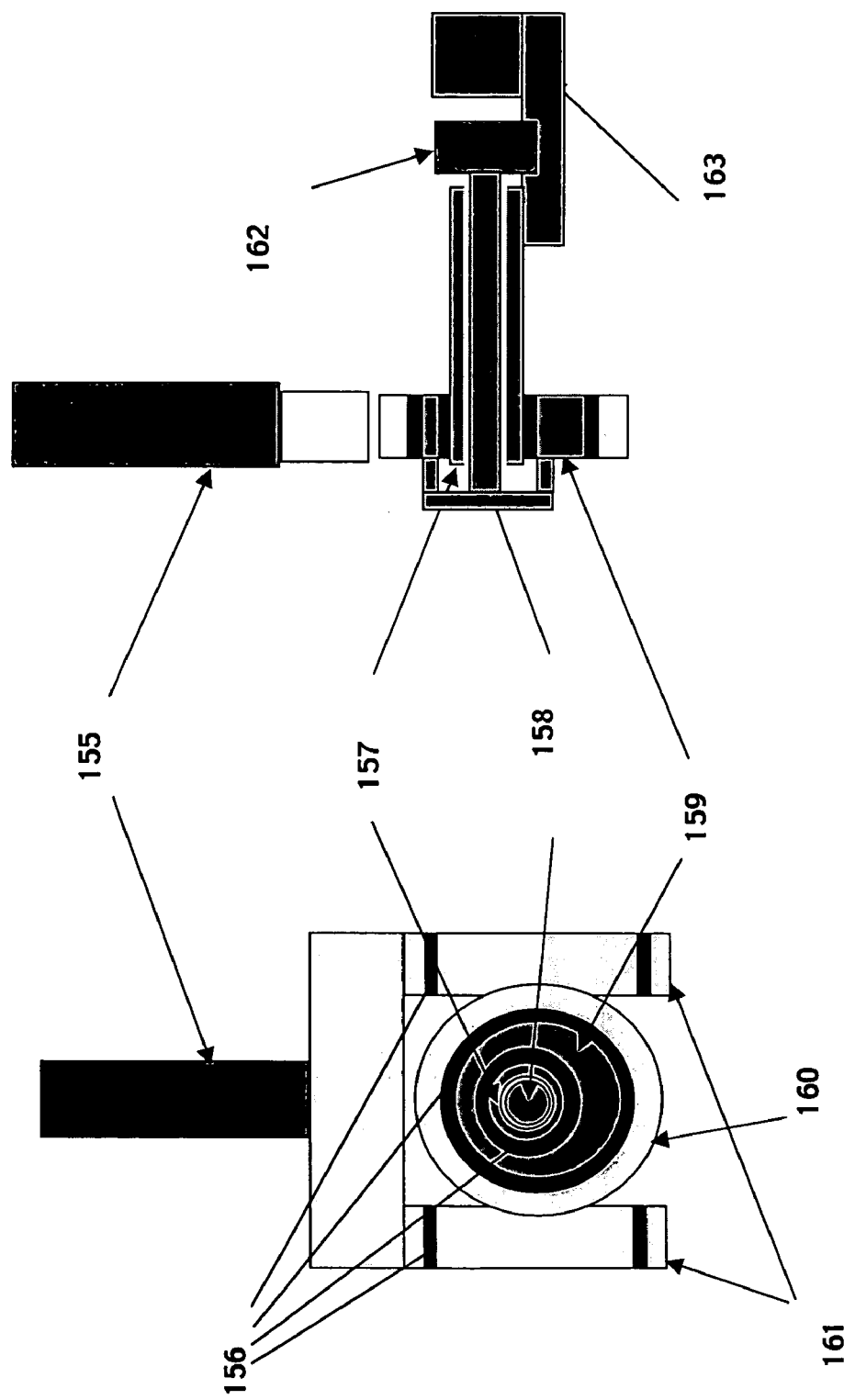

FIG. 30 shows how the kinematic centre of the joint is controlled by a motor with a gear box (speed reducer). The concept builds on the use of an excentric inner wheel in one of the bearings of the joint. This excentric wheel has bearing balls or cylinders on both its inner and outer surface and when rotating this excentric wheel with the motor, the axis centre of the first bearing in the joint will be translated. The figure shows detailed design of actuators A1 and A2 as implemented as motor controlled joint centre manipulators.

The reference numbers in the figure are:

155: Link strut

156: Bearings

157: Base axis for the joint

158: Driving axis for excenter wheel

159: Excenter wheel

160: A bearing with excentric driven middle part

161: Concentric bearings

162: Motor and speed reducer

163: Joint support on linear track courier of main axis

FIG. 31 shows an alternative design of the motor controlled joint centre manipulator. Here the link is mounted on the motor controlled bearing instead of on the bearing closest to the carriage as in FIG. 30.

Figure 32:
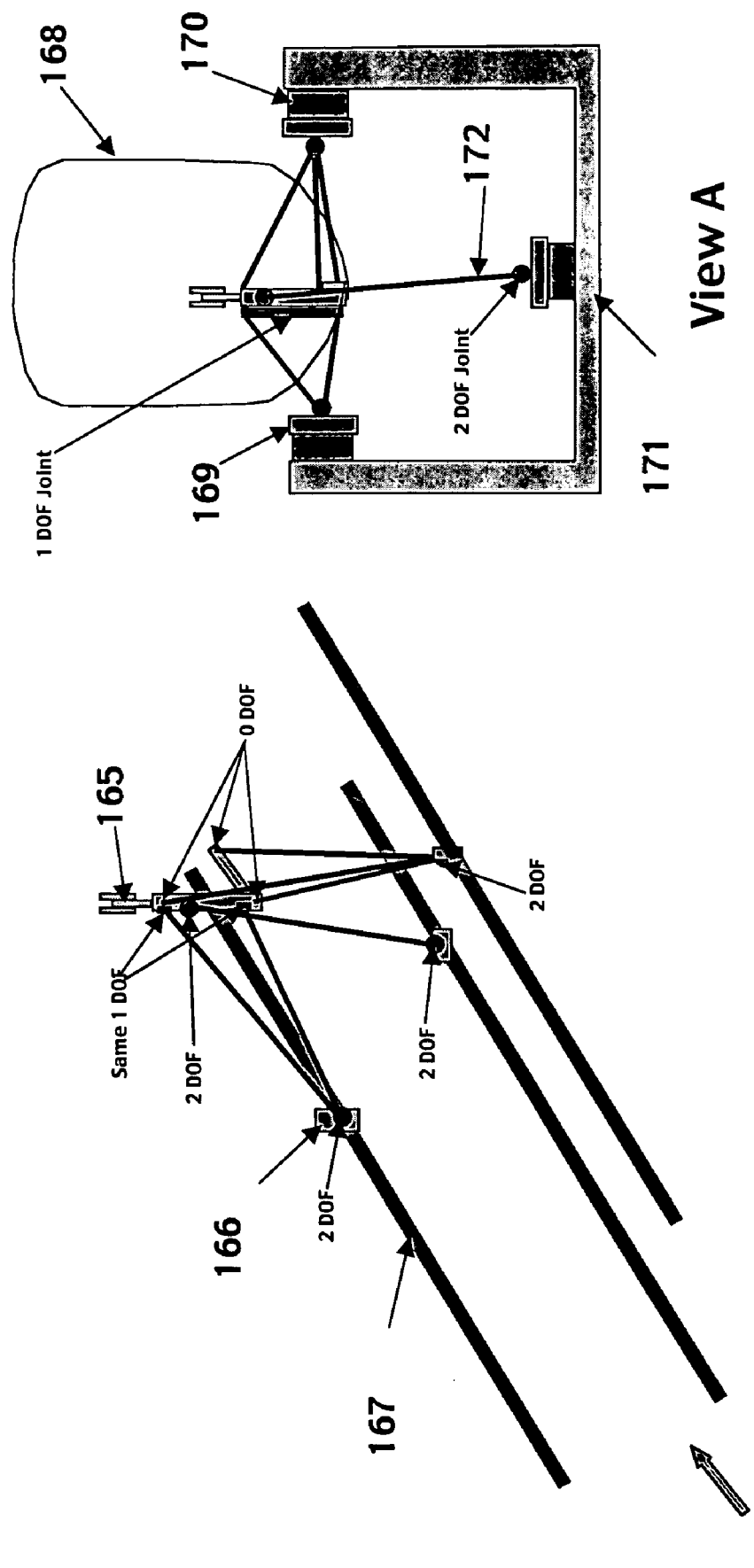

FIG. 32 shows a special manipulator designed to be used as a clamping device in a fixture or a gripper. The purpose is to make it easy to reprogram the fixture or gripper and simultaneously have a stiff fixturing/gripping of an object. Thus the clamping device contains 3 actuated linear modules with one courier (carriage) on each. The couriers are connected to a platform by links with the 3/2/1 clustering principle and on the platform there is a clamping component, which can be activated by for example hydraulics. In the figure arm 7 is implemented with the 3 links in a pyramid structure and arm 8 with 2 links in a triangular structure. This is motivated by the fact that the direction of the clamping component is usually not critical and that this gives the lowest number of joints (just 4 joints with 2 DOF and 2 joints with 1 DOF). However, if it is important to have a very high stiffness and/or if it is important to have a constant tilt angle of the clamping component, then a link arrangement as in for example FIG. 25 can be used. The reference numbers in the figure are:

165: A clamping mechanism, which will change the tilted angel when the platform moves up/down.

166: A courier on linear bearings

167: A linear module

168: Workspace of clamping TCP

169: A courier

170: A linear module

171: A support structure

172: A strut

Figure 33:
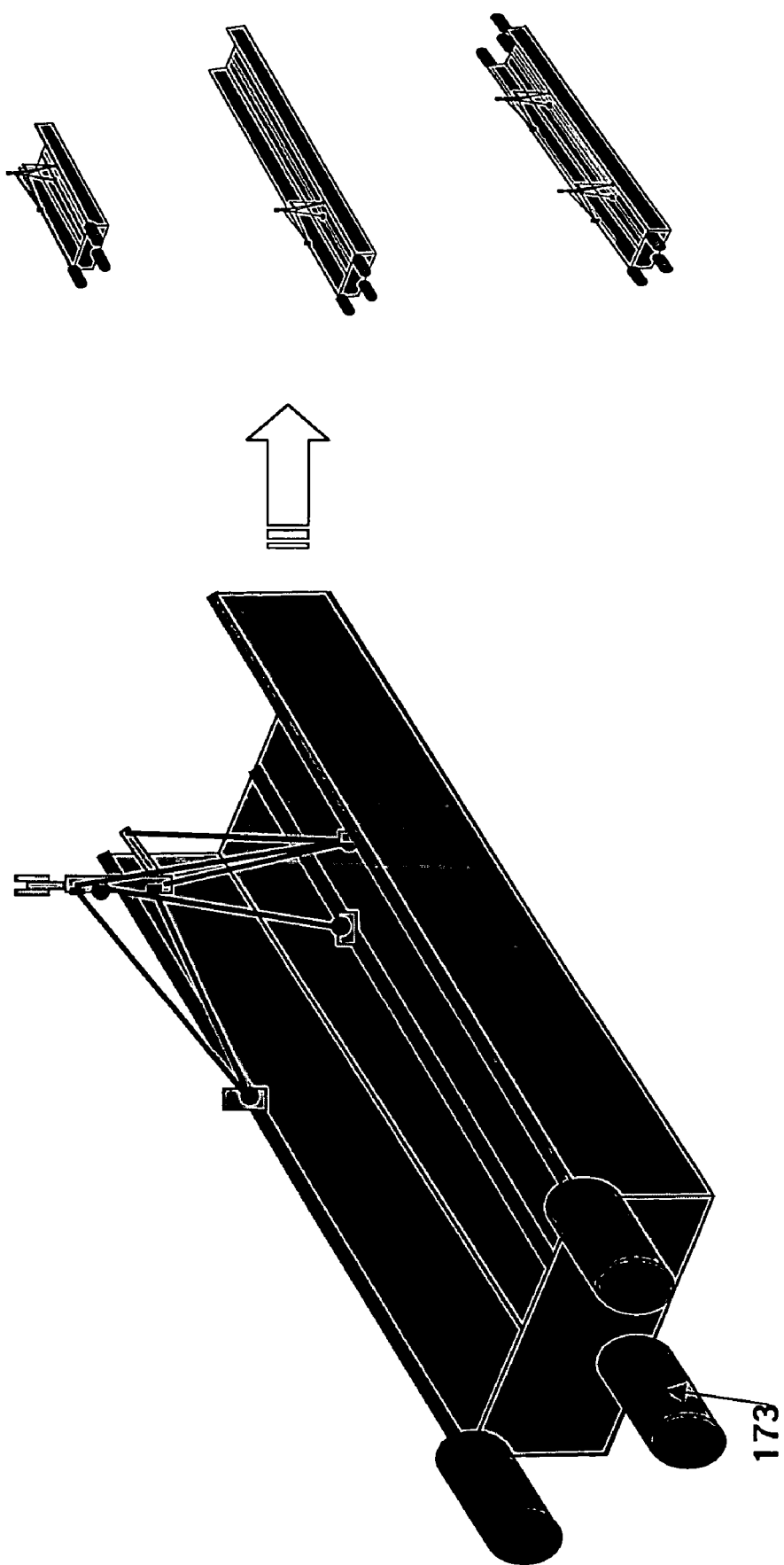

FIG. 33 shows how the clamping manipulator in FIG. 32 can be modularized with different lengths and also with 2 link structures working in the same module, actuated with motors at both ends of the support structure. The figure shown different fixturing/gripping modules.

The reference number in the figure is: 173: Motors

Figure 34:
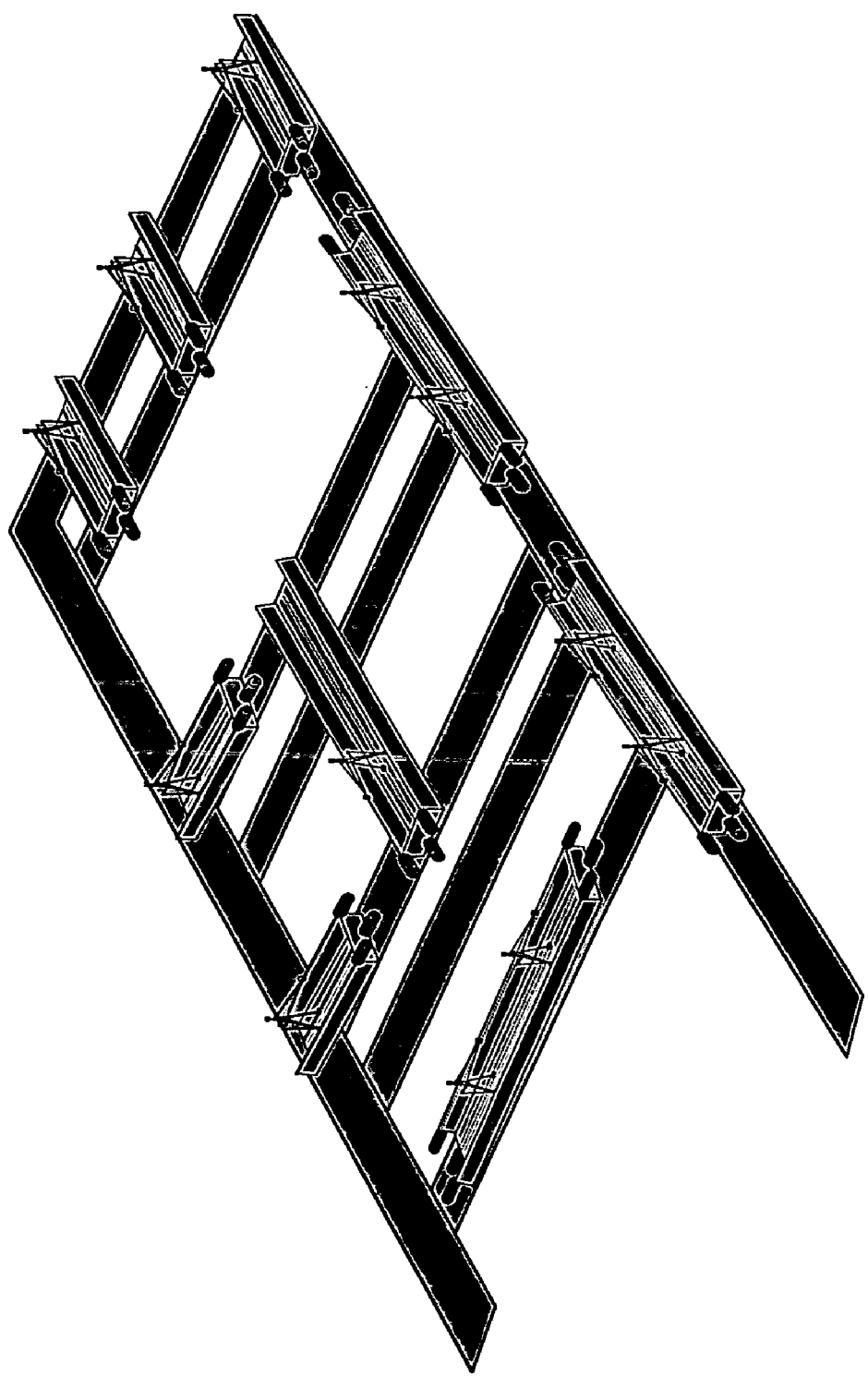

FIG. 34 exemplifies how the clamping modules shown in FIG. 33 can be mounted on a frame to form a complete fixture or gripper, for example for automobile or aerospace components. The figure shows the fixturing/gripping modules mounted on a frame to form a complete device.

Figure 35:
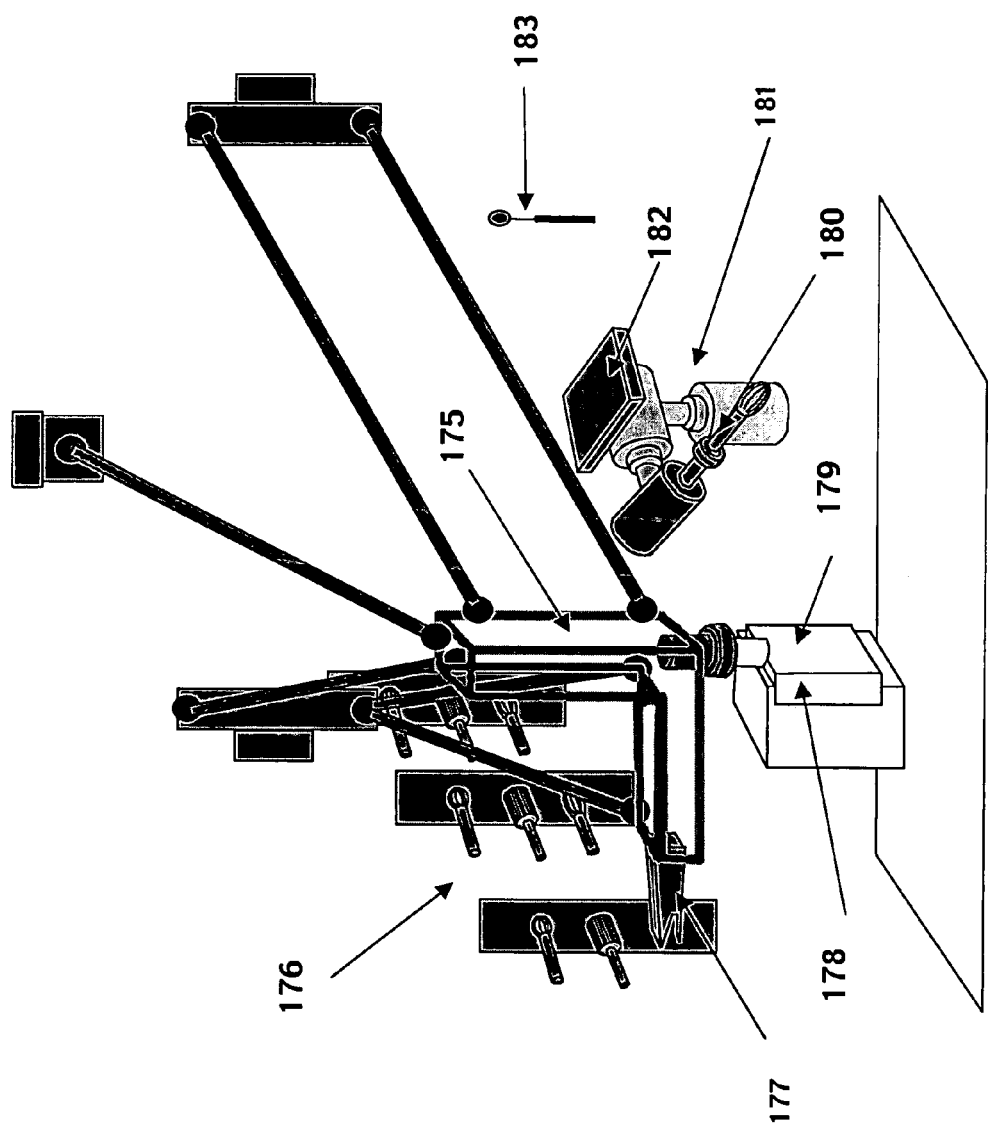

FIG. 35 exemplifies the use of the new parallel kinematic manipulator with reconfiguration feature for material removal applications as milling, drilling, deburring and grinding. In this case the spindle holding the tool is mounted on a 2 DOF floor-fixed wrist. The manipulator platform has a tool gripper and is able to make tool exchange with tools in a tool magazine. The manipulator platform also has a gripper (with gripper exchanging facilities) to move the work object relative the tool during processing. On the first axis of the wrist there is a table, on which the manipulator can put the object, after which the first wrist axis turns the object to make it possible for the manipulator to grip in from another side. To compensate for gripping errors there may be a measurement probe in the cell to measure on surfaces on the work object and then make a best fit between the measurement cloud obtained and the same surfaces measured at an earlier instance. The figure shows a flexible manufacturing system built around the reconfigurable robot with grippers on the platform and a stationary wrist on the floor. The reference numbers in the figure are:

175: A platform

176: A tool magazine

177: A tool gripper

178: An object gripper

179: A side gripper

180: A tool spindle

Figure 36:
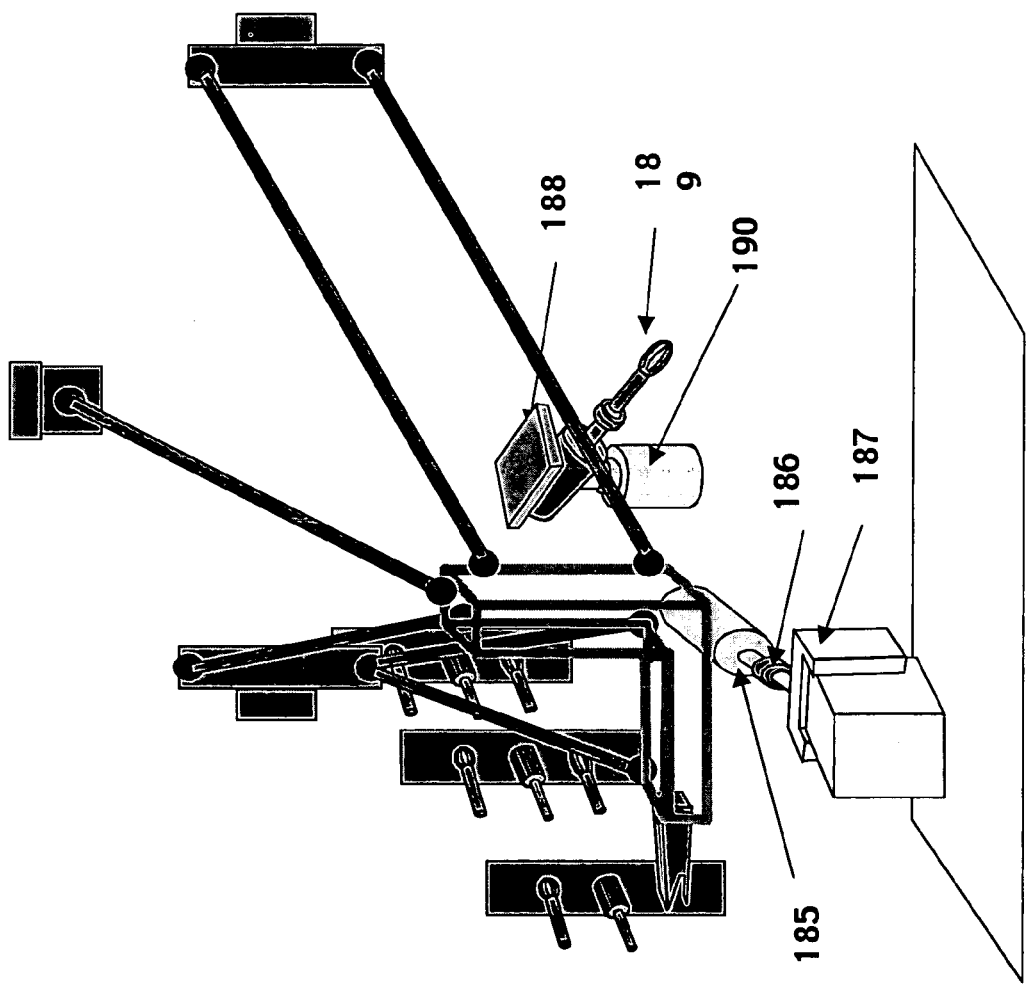

181: A wrist with two axes fixed to the floor
182: A table for turning the work object
183: A measurement probe, for example a LVDT FIG. 36 shows an alternative configuration of the wrist axes. Here the manipulator platform is equipped with a 1 DOF wrist, which manipulates the gripper and the floor-mounted wrist is also of 1 DOF. As in FIG. 35 the floor-mounted wrist manipulates both the spindle and the table for changing gripping direction. The figure shows a flexible manufacturing system built around the reconfigurable robot with tool gripper and a stationary 1 DOF floor mounted wrist holding the tool and the spindle.

The reference numbers in the figure are:
185: 1 DOF wrist for the manipulator of the gripper
186: A gripper attacher
187: A side gripper
188: A table for turning the work object
189: A tool
190: 1 DOF wrist mounted on the floor for the manipulation of the spindle with its tool.

Figure 37:
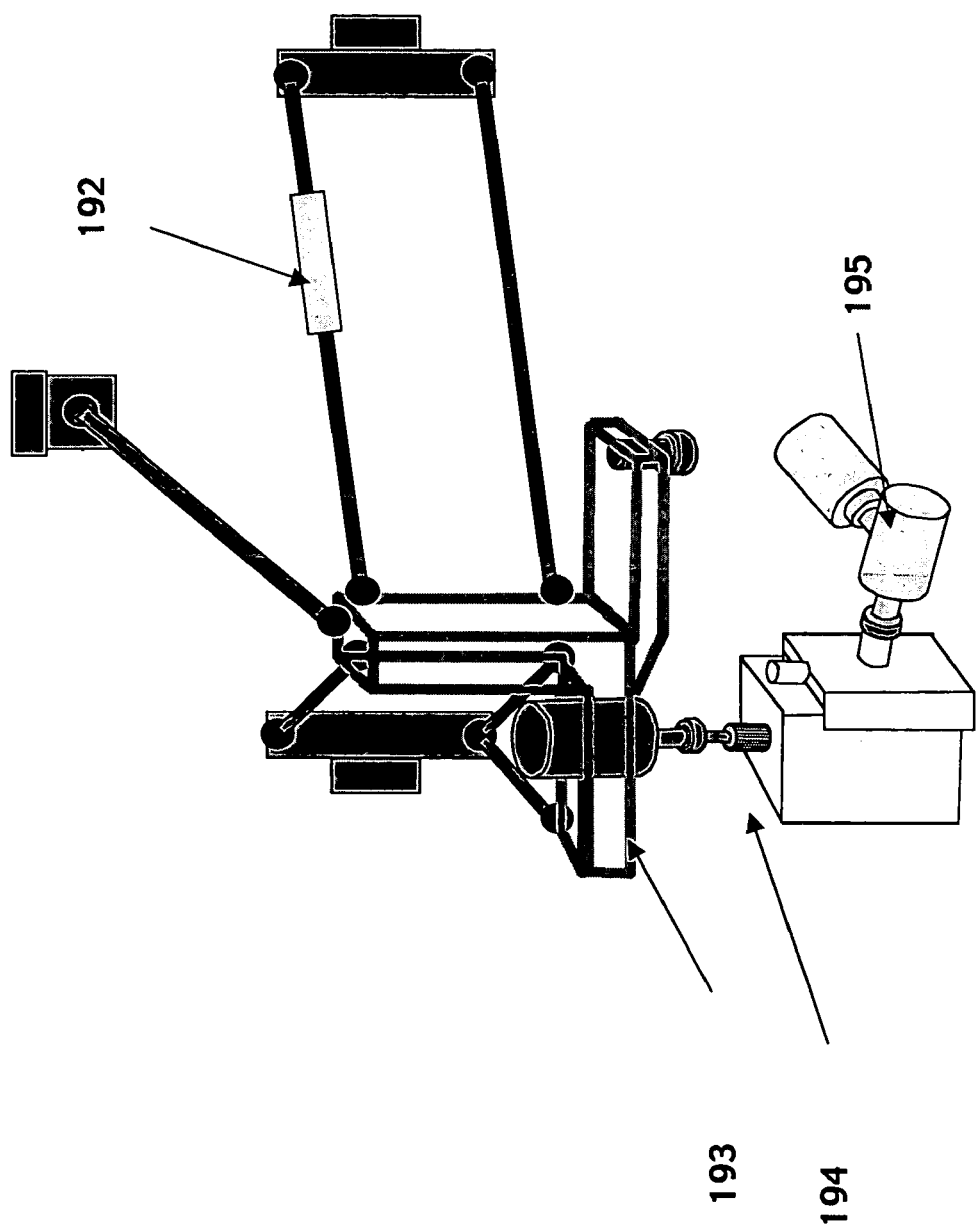

There are of course many combinations for where to put the wrist axes and where to put the tooling. Thus, FIG. 37 shows one more combination, in which the floor-mounted wrist having 2 DOF holds the gripper while the manipulator holds the tooling. In this design a linear actuator is added to one of the links to increase the mobility and precision in some critical orientation relations between the tool and the work object. This actuator could for example be a piezo-electric stack. The reference number in the figure is:
192: A linear actuator to be able to obtain all possible tool angles in relation to the work object with high accuracy.
193: A spindle mounted on the platform.
194: A tool fixed to a tool exchanger
195: 2 DOF floor mounted wrist for the manipulation of the work object.

Figure 38:
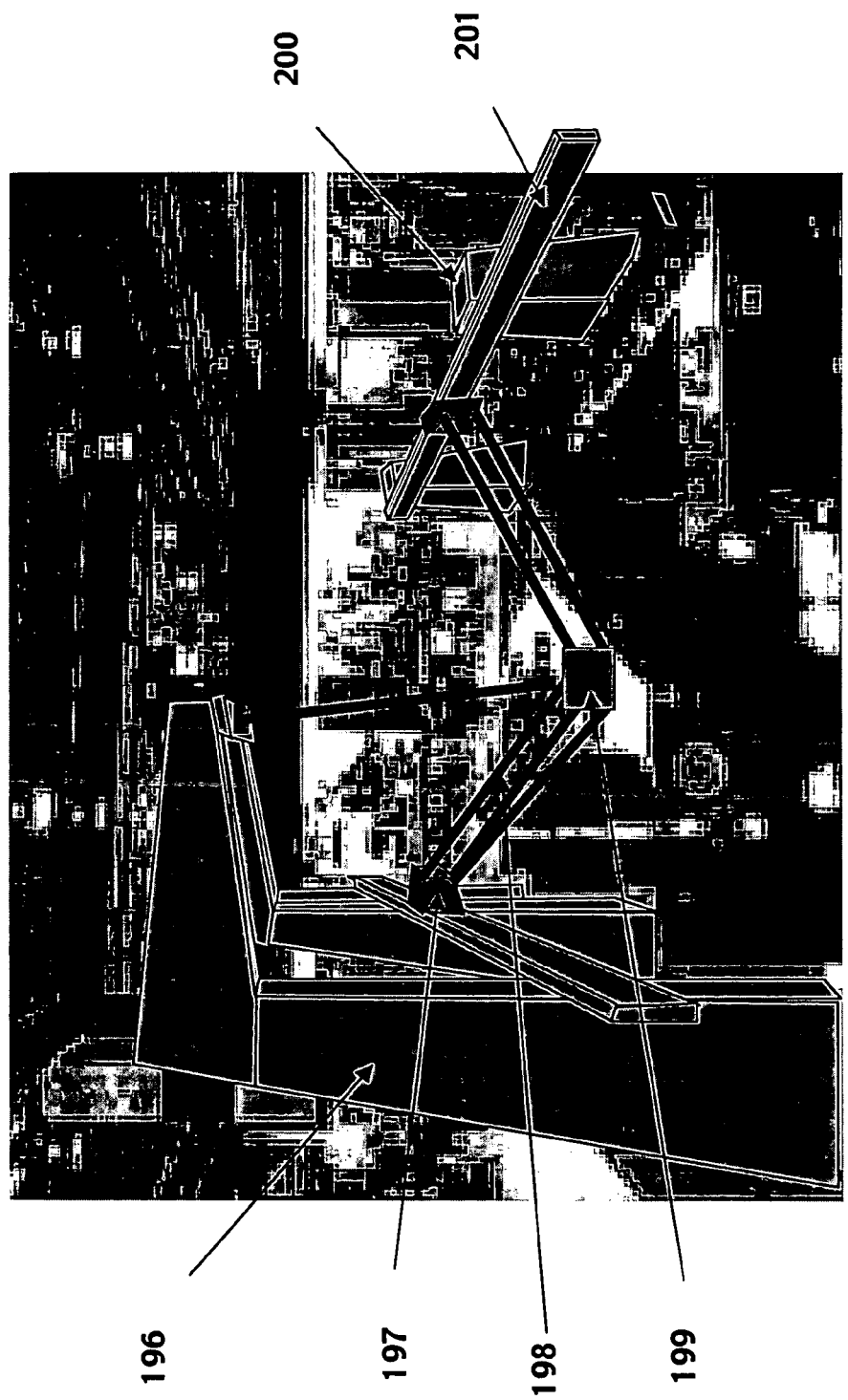

FIG. 38 exemplifies how the parallel kinematic manipulator can replace big, expensive and very heavy serial kinematic gantry manipulators. Using the new manipulator concept with the possibility to reconfigure the link structure a bigger workspace can be obtained with very low moving mass. The linear actuators are fixed to simple support structures and using ball screws for the linear actuation no moving cables are needed. Moreover, the manipulator will be very simple to assemble since the link structure is not kinematically redundant. The figure shown a parallel link structure mounted on three linear modules, which are supported with support columns. The set up is to be used for drilling, machining and assembly of aerospace components.

Figure 39:
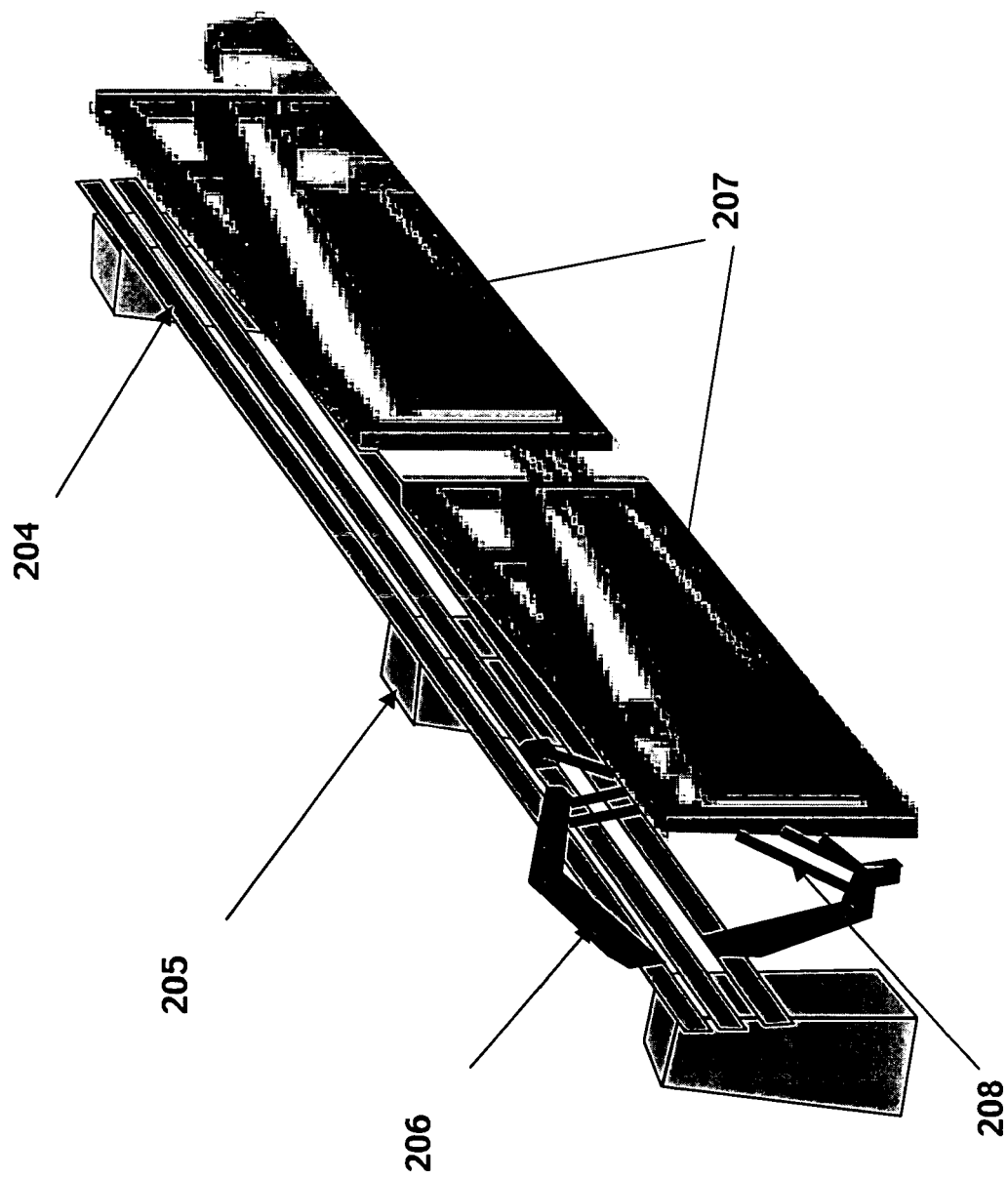

The reference numbers in the figure are:
196: Support columns
197: Carriages
198: Links
199: A platform
200: Support columns
201: Linear actuation modules FIG. 39 shows an alternative way of using the new parallel kinematic structure, adapted to the case when the work object is mounted in a vertical direction. In this case the linear actuators are mounted close together and the links are mounted on arms carried by the carriages. The figure shows a set up for drilling, deburring and fixturing of vertically mounted aerospace components. The reference numbers in the figure are:
204: Linear actuation modules
205: Support columns
206: Arms on carriages
207: Links
208: Airplane components in vertically mounted jigs.

Figure 40:
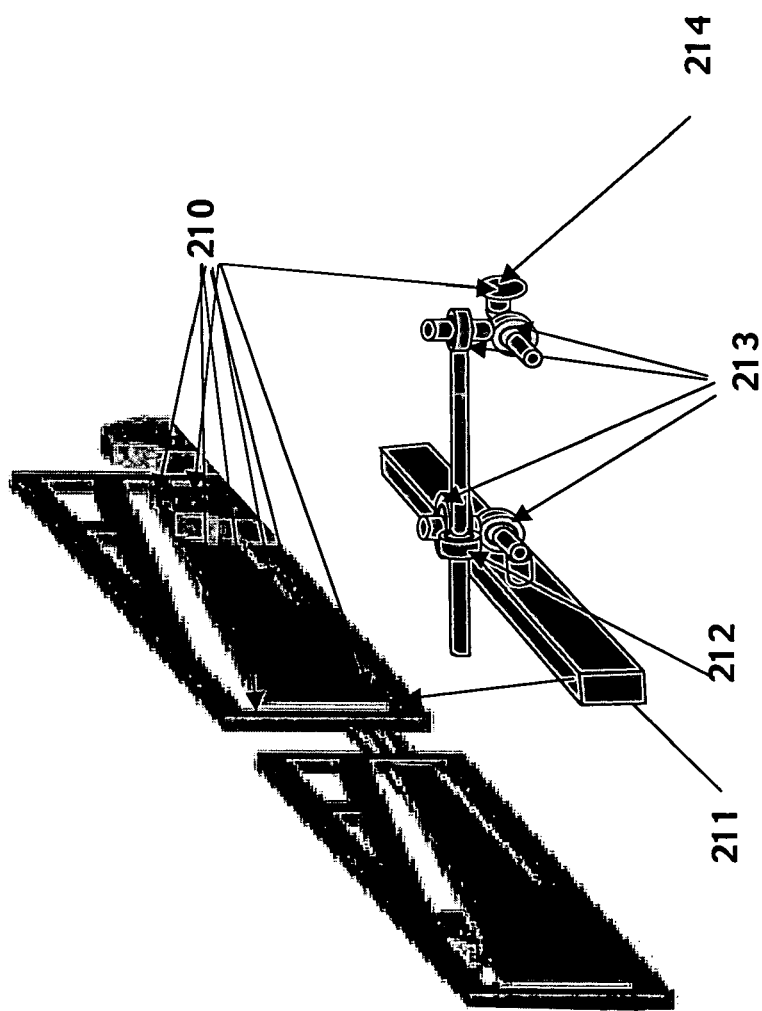

FIG. 40 shows a flexible manually operated fixturing concept, compare the actuated concept in FIGS. 32-34. The manipulator is used to give the position and orientation of the clamping and the fixturing elements are moved manually and clamped to the manipulator platform. When clamped the joints of the fixturing element are locked and then the clamping is released and the manipulator can move to the next fixturing point. The figure shows use of flexible fixturing elements that are calibrated by the parallel kinematic manipulator. The robot program for the definition of the orientations and positions of the fixturing mounting plates can be off-line generated from a CAD-system.

1. Robot moves to correct position and orientation for the fixture point, carrying a fixture mounting plate adapter.
2. The operator makes the 6 bearings of the fixturing device free and mounts the fixture plate on the fixture plate adapter on the robot.
3. The operator locks the 6 bearings and dismounts the fixture mounting plate from the fixture plate adapter on the robot.
4. The robot moves to the correct position and orientation for the next fixturing plate etc.

The reference numbers in the figure are:
210: Fixturing points with individually adjustable 5 or 6 DOF structures.
211: Fixture frame
212: Combined rotating and prismatic bearing that can be locked manually.
213: Four rotating bearings that can be locked manually.
214: Fixture mounting plate.

Figure 41:
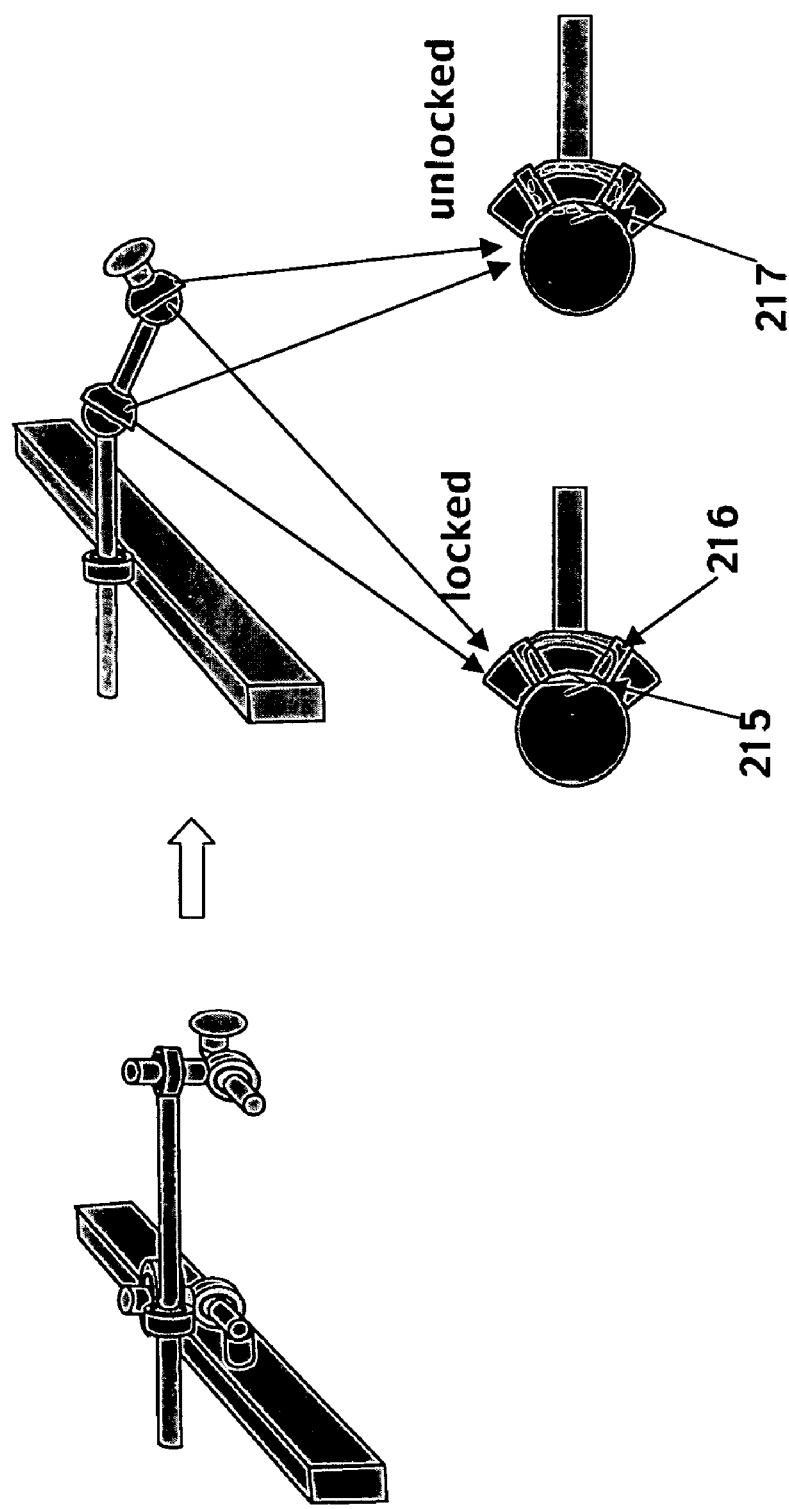

FIG. 41 exemplifies the design of the fixturing elements, with serial kinematics, using hinges or ball and socket bearings that can be locked. The reference numbers in the figure are:
215: Non air gap
216: Rare earth magnet or electromagnet
217: Small air-gap or lowered current to an electromagnetic.

Figure 42:
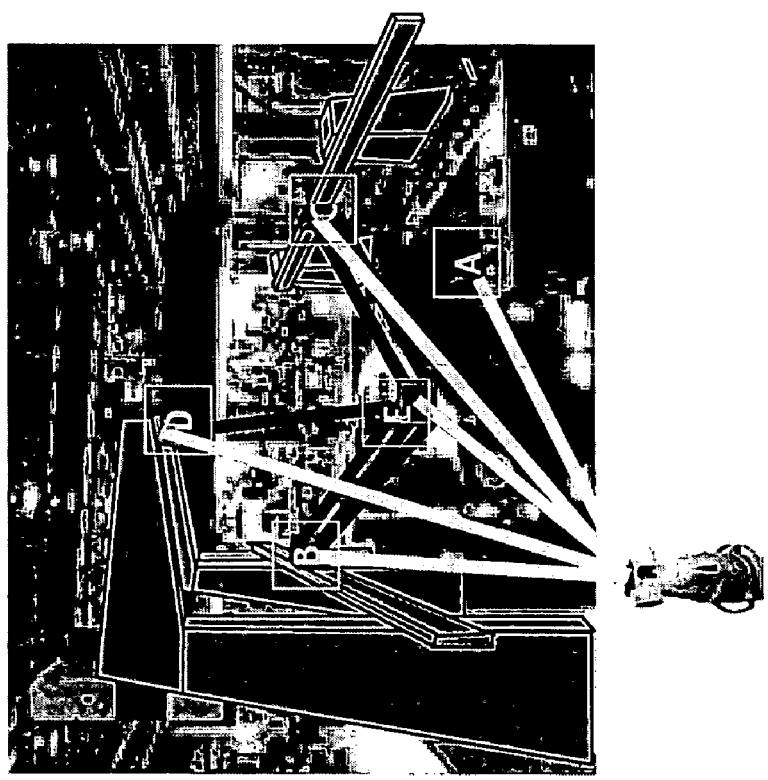

FIG. 42 shows how the parallel kinematic manipulator can be calibrated using a 3D laser measurement system as a Leica laser tracker. A method to calibrate a parallel kinematic manipulator using a laser-based position measurement system.

1. Reflectors are mounted in 3 positions on a reference structure A, which will be used for home calibration of the manipulator during operation. The position and orientation of A is measured in the Leica measuring coordinate system and a base coordinate system is defined in A, to be used in the rest of the measurements.
2. The track courier coordinate systems B, C and D are measured in relation to A at different controlled positions and measured errors in relation to the nominal kinematics are described by splines, which are used for error compensation at robot control.
3. The manipulated platform coordinate system E is measured in relation to A for different positions in the work space and the results of these measurements are used for best fit of the linkage error parameters, for example by means of a nonlinear optimization method (in the Matlab optimisation toolbox).
4. The wrist axes are calibrated when the manipulated platform is in one fixed position (or more than one fixed position if this is needed for the accessibility of the light beam).

FIG. 43 shows how the linear tracks (paths) can be calibrated using the same laser-based measuring systems that are used for serial linear manipulators today. The figure shows a method to calibrate the parallel kinematic manipulator using the same type of laser-based measuring system that is used for serial gantry manipulators today.

1. Mount the laser on the reference A, for example with a kinematic coupling; and measure C in relation to A at different positions of C. Use the result to calculate the splines that are later used for error compensation of C.

2. Mount the laser on reference C and measure B relative C when B and C are moved synchronously. Use the results to calculate splines for error compensation of B as a function of the courier position (from the linear encoder).

3. Mount the laser on reference C in the direction towards D and repeat the measurements described in 2. Calculate error splines for D.

4. Mount the laser in A in different directions and measure E when the manipulator is run to follow the beam in the different directions. Make best fit of the results to identify the errors in the link assembly.

Figure 44:
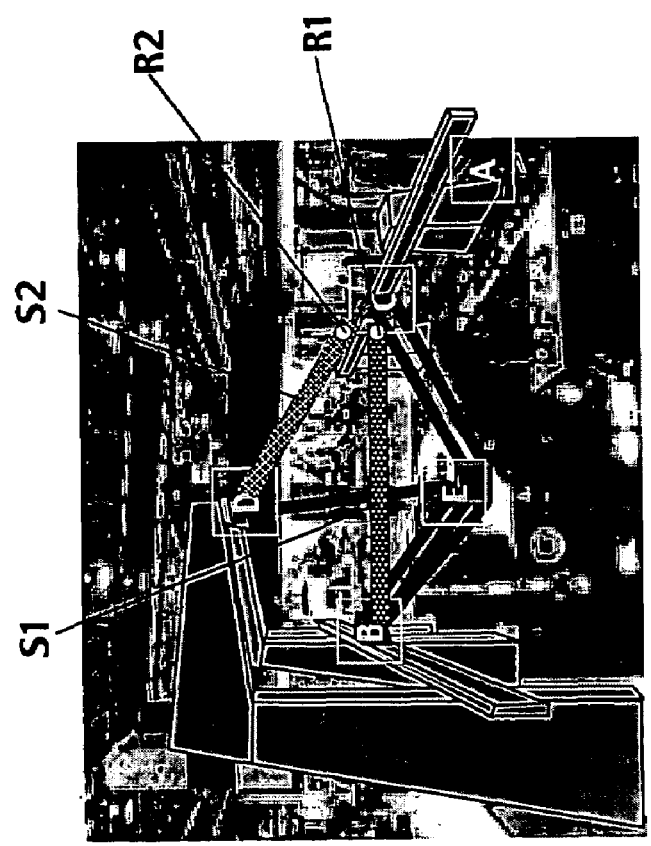

The reference numbers in the figure are:
220: Measurement of pitch, roll and yaw and straightness see for example www.cmmxyz.com/369CC/371.html
221: Groove
222: Ball FIG. 44 shows an alternative way to calibrate the linear actuators using the same laser-based measuring systems that are used for serial linear manipulators today. The figure shows an alternative method to calibrate a parallel kinematic manipulator using the same type of laser-based method measuring system that is used for serial gantry manipulators today.

1. Mount the laser on the reference A, for example with a kinematic coupling; and measure C in relation to A at different positions of C. Use the result to calculate the splines that are later used for error compensation of C.

2. Mount a strut S1 on courier at B and a reflector R1 at the end of the strut in the light beam of the laser measurement system still mounted at A and move the courier at B. Measure R1 in relation to A at different positions of B. Use the results to calculate splines for error compensation of B as a function of the courier position (from the linear encoder).

3. Mount a strut S2 on courier at D and a reflector R2 at the end of the strut in the light beam of the laser measurement system still mounted at A and move the courier at D. Measure R2 in relation to A at different positions of D. Use the results to calculate splines for error compensation of D as a function of the courier position (from the linear encoder).

The present invention is not limited to the embodiments disclosed but may be varied and modified within the scope of the following claims.

I claim:

1. An industrial robot for movement of an object in space, comprising:
    a platform arranged for carrying the object,
    a first arm arranged for influencing the platform in a first movement and comprising a first actuator having a first path and a first carriage linearly movable along the first path, and a first and a second link, each link comprising an outer joint connected to the platform and an inner joint connected to the first carriage, wherein the first link of the first arm is arranged with its longitudinal axis non-parallel to the longitudinal axis of the second link of the first arm,
    a second arm arranged for influencing the platform in a second movement, comprising a second actuator having a second path and a second carriage linearly movable along the second path, and two links, each link comprising an outer joint connected to the platform and an inner joint connected to the second carriage,
    a third arm arranged for influencing the platform in a third movement, comprising a third actuator and at least one link comprising an outer joint connected to the platform and an inner joint connected to the third actuator, and
    a control unit controlling the movements of the platform, wherein
    the first arm is arranged rotatable about at least one axis perpendicular to a first plane comprising the first and second paths, wherein the inner joints of the first and second links of the first arm are arranged along the at least one axis perpendicular to the first plane,
    the second arm is arranged rotatable about at least one axis perpendicular to said first plane,
    the first and second arm are arranged rotatable in such way that the platform is movable between opposite sides of a second plane perpendicular to said first plane and passing through and continuously following the first and second carriage, and
    said control unit comprises control means adapted to upon command perform a reconfiguration of the platform and the arms of the robot, wherein the reconfiguration comprises moving the platform between opposite sides of said second plane.

2. The industrial robot according to claim 1, wherein the inner joints of the first and second link of the first arm are arranged at a distance from each other in a direction perpendicular to said first plane.

3. The industrial robot according to claim 1, wherein said first arm comprises a third link comprising an outer joint connected to the platform and an inner joint connected to the first carriage.

4. The industrial robot according to claim 1, wherein the inner joint of the third link is also arranged along said axis.

5. The industrial robot according to claim 1, wherein the inner joints of the second arm are arranged along a line which is parallel to said common line along which said joints of the first arm are arranged.

6. The industrial robot according to claim 1, wherein the inner joint of the first link and the inner joint of the second link is a common joint.

7. The industrial robot according claim 1, wherein one of the links are provided with a locking mechanism, which upon activation prevents the link from rotating about its longitudinal axis.

8. The industrial robot according to claim 7, wherein said locking mechanism is arranged to prevent the link from rotating about its longitudinal axis when the robot passes through a singularity during a reconfiguration.

9. The industrial robot according to claim 1, wherein both the inner and outer joint of one of the links are arranged movable in only two degrees of freedom, and said one link is provided with a play arranged to take care of minor rotary movements about the longitudinal axis of the link.

10. The industrial robot according to claim 1, wherein said link of the third arm is provided with a locking unit having a locked state, in which the link is fixed relative to its inner joint, and an unlocked state, in which the link is allowed to move in relation to its inner joint in a direction along the longitudinal axis of the link.

11. The industrial robot according to claim 1, wherein the link of the third arm is arranged with an adjustable length, and the third arm includes an actuator adapted to control the length of the link.

12. The industrial robot according to claim 1, wherein one of the links of the first or second arm is provided with a locking member, which upon activation prevents the link from moving in a direction perpendicular to the first plane.

13. The industrial robot according to claim 12, wherein said locking member is arranged to lock one of the joints of said link provided with the locking member, from rotating about an axes parallel to the first plane.

14. The industrial robot according to claim 1, wherein the two links of the second arm have essentially the same length and are arranged with their longitudinal axes in parallel.

15. The industrial robot according to claim 1, wherein at least two of the links of the first arm are arranged so that they, from at least one point of view, are in parallel.

16. The industrial robot according to claim 1, wherein at least two of the links of the first arm have essentially the same length.

17. An industrial robot for movement of an object in space, comprising:
- a platform arranged for carrying the object,
- a first arm arranged for influencing the platform in a first movement and comprising a first actuator having a first path and a first carriage linearly movable along the first path, and a first and a second link, each link comprising an outer joint connected to the platform and an inner joint connected to the first carriage, wherein the distance between the inner joint of the first link, and the inner joint of the second link is shorter than the distance between the outer joint of the first link and the outer joint of the second link,
- a second arm arranged for influencing the platform in a second movement, comprising a second actuator having a second path and a second carriage linearly movable along the second path, and two links, each link comprising an outer joint connected to the platform and an inner joint connected to the second carriage,
- a third arm arranged for influencing the platform in a third movement, comprising a third actuator and at least one link comprising an outer joint connected to the platform and an inner joint connected to the third actuator, and
- a control unit controlling the movements of the platform, wherein the first arm is arranged rotatable about at least one axis perpendicular to a first plane comprising the first and second paths, wherein the inner joints of the first and second links of the first arm are arranged along the at least one axis perpendicular to the first plane, the second arm is arranged rotatable about at least one axis perpendicular to said first plane, the first and second arm are arranged rotatable in such way that the platform is movable between opposite sides of a second plane perpendicular to said first plane and passing through and continuously following the first and second carriage, and said control unit comprises control means adapted to upon command perform a reconfiguration of the platform and the arms of the robot, wherein the reconfiguration comprises moving the platform between opposite sides of said second plane.

* * * * *